(12) United States Patent
Hovhannisyan et al.

(10) Patent No.: US 11,508,021 B2
(45) Date of Patent: Nov. 22, 2022

(54) PROCESSES AND SYSTEMS THAT DETERMINE SUSTAINABILITY OF A VIRTUAL INFRASTRUCTURE OF A DISTRIBUTED COMPUTING SYSTEM

(71) Applicant: VMware, Inc., Palo Alto, CA (US)

(72) Inventors: Arman Hovhannisyan, Yerevan (AM); Bella Margaryan, Yerevan (AM); Khachik Nazaryan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 23 days.

(21) Appl. No.: 16/517,887

(22) Filed: Jul. 22, 2019

(65) Prior Publication Data
US 2021/0027401 A1    Jan. 28, 2021

(51) Int. Cl.
*G06Q 30/00* (2012.01)
*G06Q 50/16* (2012.01)
*G06Q 10/06* (2012.01)

(52) U.S. Cl.
CPC ..... *G06Q 50/163* (2013.01); *G06Q 10/06315* (2013.01)

(58) Field of Classification Search
CPC .......... G06Q 50/163; G06Q 10/06315; G06Q 10/06375; G06Q 10/06395; G06Q 10/00; G06Q 10/02; G06Q 10/06; G06Q 10/10; G06Q 30/02; G05B 2219/31357
See application file for complete search history.

(56) References Cited

U.S. PATENT DOCUMENTS

| | | | |
|---|---|---|---|
| 10,101,787 B1* | 10/2018 | Bailey | G06F 1/3206 |
| 2005/0273358 A1* | 12/2005 | Zimmerman | G06Q 10/30 705/308 |
| 2007/0033325 A1* | 2/2007 | Sinclair | G06F 3/0608 711/170 |

(Continued)

OTHER PUBLICATIONS

Markovic, Dragan S., et al. "Smart power grid and cloud computing." Renewable and Sustainable Energy Reviews 24 (2013): 566-577. (Year: 2013).*

*Primary Examiner* — Joseph M Waesco
*Assistant Examiner* — Jay-Ming Wang

(57) ABSTRACT

Processes and systems determine sustainability of a virtual infrastructure of a distributed computing system. In one aspect, sustainability metrics are determined based on power usage by resources of the virtual infrastructure. Processes and systems also determine metrics that represent power wasted by idle virtual objects of the virtual infrastructure, reclaimable capacities of resources used by the virtual infrastructure, and one or more recommendations for reducing $CO_2$ emissions and power wastage by the virtual infrastructure based on one or more of the sustainability metrics, the power wasted metrics, and the reclaimable capacity. Processes and systems display the sustainability metrics, power wasted metrics, and reclaimable capacity of the objects in a graphical user interface ("GUI"). The GUI displays alerts identifying objects wasting power and at least one recommendation for reducing $CO_2$ emissions and power wastage. A user may execute one or more of the recommendations for reducing $CO_2$ emissions and power wastage.

12 Claims, 35 Drawing Sheets

(56) References Cited

U.S. PATENT DOCUMENTS

| | | | |
|---|---|---|---|
| 2008/0177605 A1* | 7/2008 | Zimmerman | G06Q 10/06 705/7.37 |
| 2008/0319812 A1* | 12/2008 | Sousa | G06Q 10/0637 705/1.1 |
| 2009/0201293 A1* | 8/2009 | Tung | G06Q 10/04 713/100 |
| 2009/0281677 A1* | 11/2009 | Botich | G06Q 10/00 705/400 |
| 2010/0030578 A1* | 2/2010 | Siddique | H04W 4/00 705/26.1 |
| 2012/0065802 A1* | 3/2012 | Seeber | H04L 12/2825 700/295 |
| 2012/0310416 A1* | 12/2012 | Tepper | F24F 11/62 700/286 |
| 2013/0024641 A1* | 1/2013 | Talagala | G06F 11/3442 711/170 |
| 2013/0290511 A1* | 10/2013 | Tu | G06F 9/5072 709/224 |
| 2013/0339104 A1* | 12/2013 | Bose | G06Q 10/0637 705/7.36 |
| 2014/0324407 A1* | 10/2014 | Chen | G06F 30/00 703/13 |
| 2015/0278968 A1* | 10/2015 | Steven | G06Q 50/06 705/7.35 |
| 2016/0013652 A1* | 1/2016 | Li | H02J 3/004 307/24 |
| 2016/0057039 A1* | 2/2016 | Htay | H04L 43/0876 709/224 |
| 2016/0092816 A1* | 3/2016 | Wuertele | G06Q 10/06315 705/7.25 |
| 2016/0124773 A1* | 5/2016 | Gaurav | G06Q 10/04 718/104 |
| 2016/0246533 A1* | 8/2016 | Waldspurger | G06F 3/0631 |
| 2019/0102718 A1* | 4/2019 | Agrawal | G06Q 10/06315 |
| 2019/0172161 A1* | 6/2019 | Conboy | B27N 9/00 |
| 2020/0104066 A1* | 4/2020 | Waldspurger | G06F 3/0604 |

* cited by examiner

FIG. 21B

| Operations Manager | Home | Dashboards | Alerts | | | | |
|---|---|---|---|---|---|---|---|
| Symptom Definitions | | | | | | | Q C △ ⚙ ∨ |

Metric / Property   Message Event   Fault   Metric Event

| Name | Criticality | Object Type | Metric Name | Operator | Value | Defined By |
|---|---|---|---|---|---|---|
| Power Wasted on Host - 613 | ⚠ | Host System | Super Metric\| Power Wasted on Host (watts) | is greater than | 10 | User |

2202 points to Metric Name; 2204 points to Value

FIG. 22

PROCESSES AND SYSTEMS THAT DETERMINE SUSTAINABILITY OF A VIRTUAL INFRASTRUCTURE OF A DISTRIBUTED COMPUTING SYSTEM

TECHNICAL FIELD

This disclosure is directed to automated processes and systems that determine sustainability of virtual infrastructures.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with numerous components that provide enormous computational bandwidths and data-storage capacities. These large, distributed computing systems are made possible by advances in computer networking, distributed operating systems and applications, data-storage appliances, computer hardware, and software technologies.

Many of the routine operations performed in a distributed computing system, including processing, storing, sending, receiving data, consume large amounts of electricity. For example, large distributed computing systems, such as large data centers, consume as much electricity as a city with a population of a million people. Data centers worldwide consume more than two percent of the world's electricity, corresponding to $CO_2$ ("carbon dioxide") emissions that match the airline industry. Streaming data to and from data centers is also doubling every four years, which adds to the increasing demand for electricity and increasing $CO_2$ emissions. Video streaming, for example, is expected to make up about 80 percent of Internet traffic by 2021, which is up from about 73 percent in 2016.

Although data centers provide much of the world's digital services and big data storage, the number and size of data centers are expected to increase well into the future, leading to an overall increase in energy usage and $CO_2$ emissions. As a result, data center sustainability is increasingly becoming a priority for data center owners and operators. Sustainability is the discipline of using available resources in a way that does not completely deplete the resources and maintains a balance between supply and demand for resources. Data center owners and managers seek processes and systems that can be used to reduce energy consumption and related $CO_2$ emissions.

SUMMARY

Processes and systems described herein are directed to determining sustainability of a virtual infrastructure of a distributed computing system. In one aspect, processes and systems determine sustainability metrics based on power usage by resources of the virtual infrastructure. Processes and systems also determine metrics that represent power wasted by idle virtual objects of the virtual infrastructure, reclaimable capacity of resources used by the virtual infrastructure, and determine one or more recommendations for reducing $CO_2$ emissions and power wastage by the virtual infrastructure based on one or more of the sustainability metrics, the power wasted metrics, and the reclaimable capacity of the objects. Processes and systems display the sustainability metrics, power wasted metrics, and reclaimable capacity of the objects in a graphical user interface ("GUI"), enabling users to examine sources of power wastage and corresponding amounts of $CO_2$ emissions. The GUI displays alerts identifying objects wasting power based on the power wasted metrics and displays one or more recommendations for reducing $CO_2$ emissions and power wastage. Based on the alerts and associated recommendations, a user may execute one or more of the recommendations for reducing $CO_2$ emissions and power wastage.

DESCRIPTION OF THE DRAWINGS

FIGS. 15-22 show examples of a graphical user interface that enables users to view sustainability metrics, alerts, and recommendations for reducing $CO_2$ emissions and power wastage of a distributed computing system.

DETAILED DESCRIPTION

This disclosure is directed to automated computational processes and systems that determine sustainability of a virtual infrastructure of a distributed computing system. In a first subsection, computer hardware, complex computational systems, and virtualization are described. Processes and systems for determining sustainability of a virtual infrastructure of a distributed computing system are described below in a second subsection.

Computer Hardware, Computational Systems, and Virtualization

The term "abstraction" is not, in any way, intended to mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that "software implemented" functionality is provided. The digitally encoded computer instructions are a physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
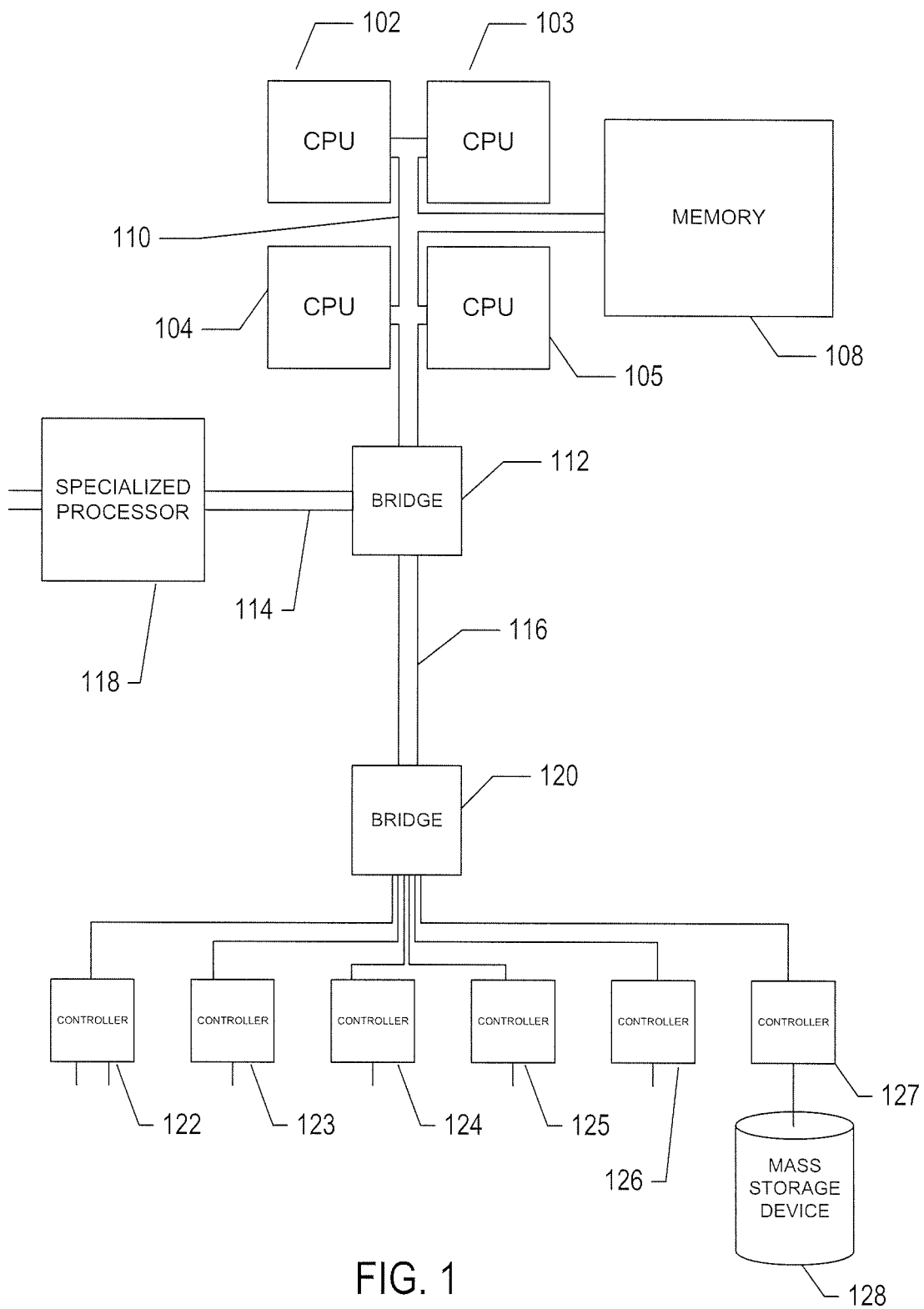
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices.

There are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
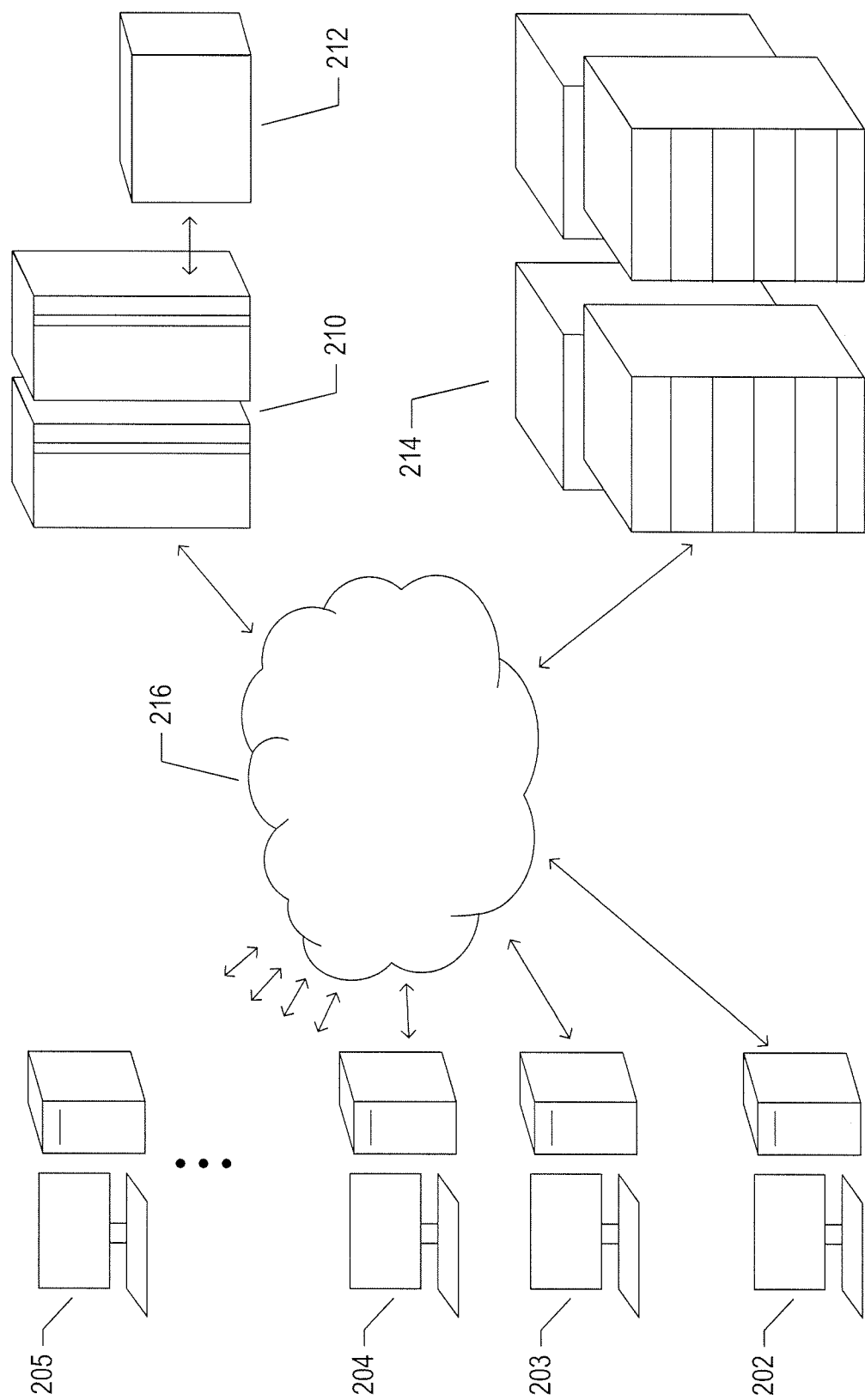
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which many PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
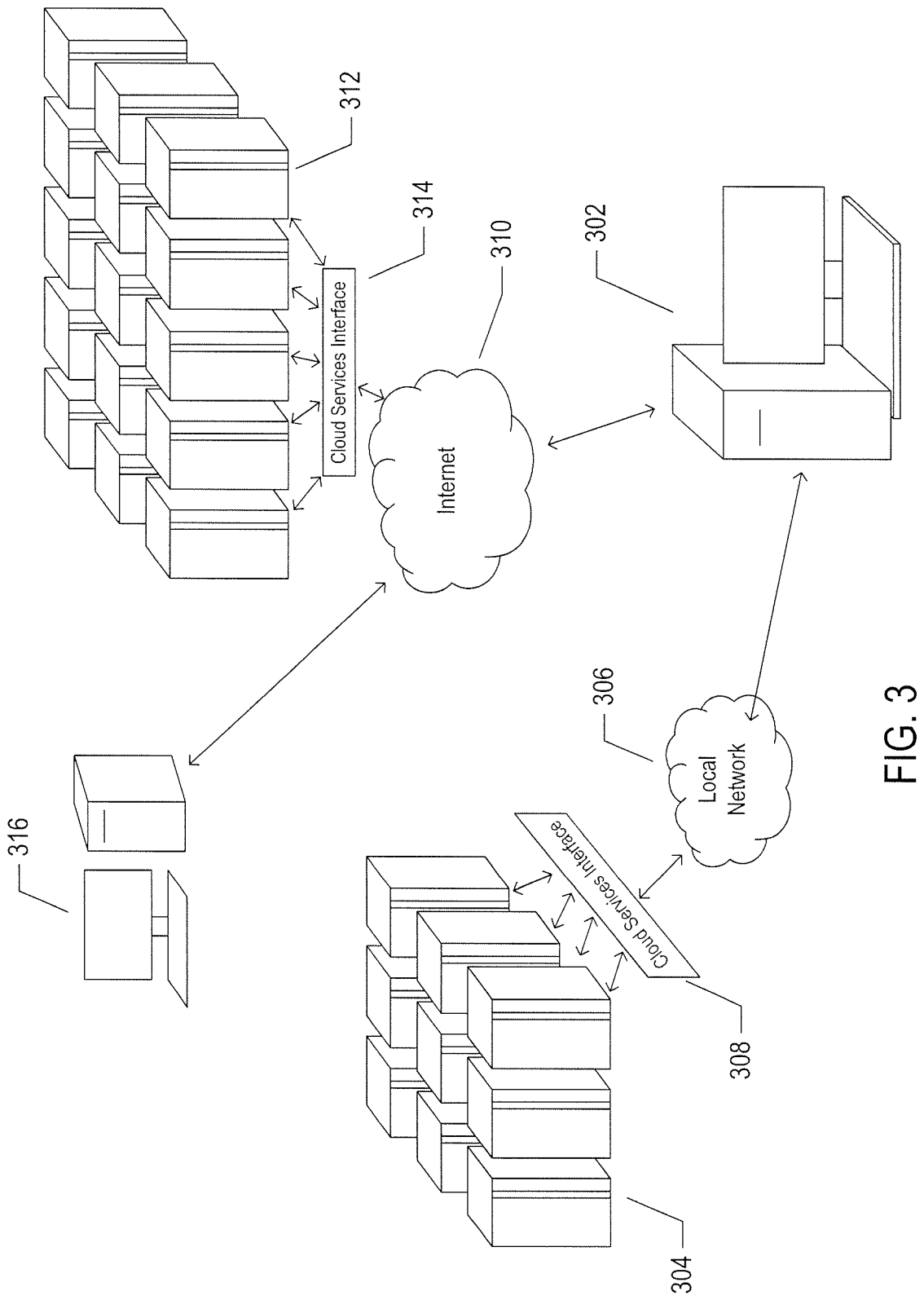
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
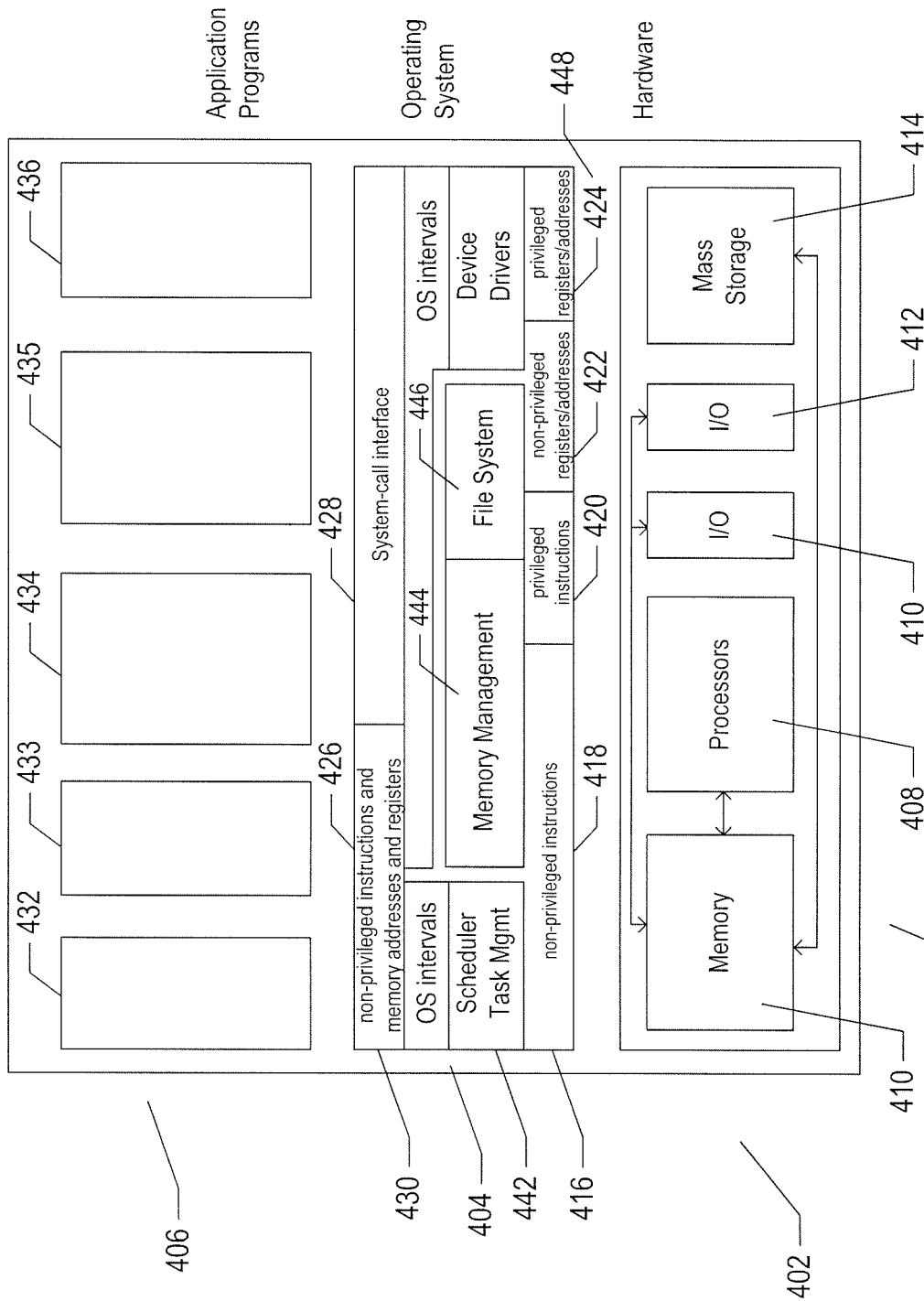
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
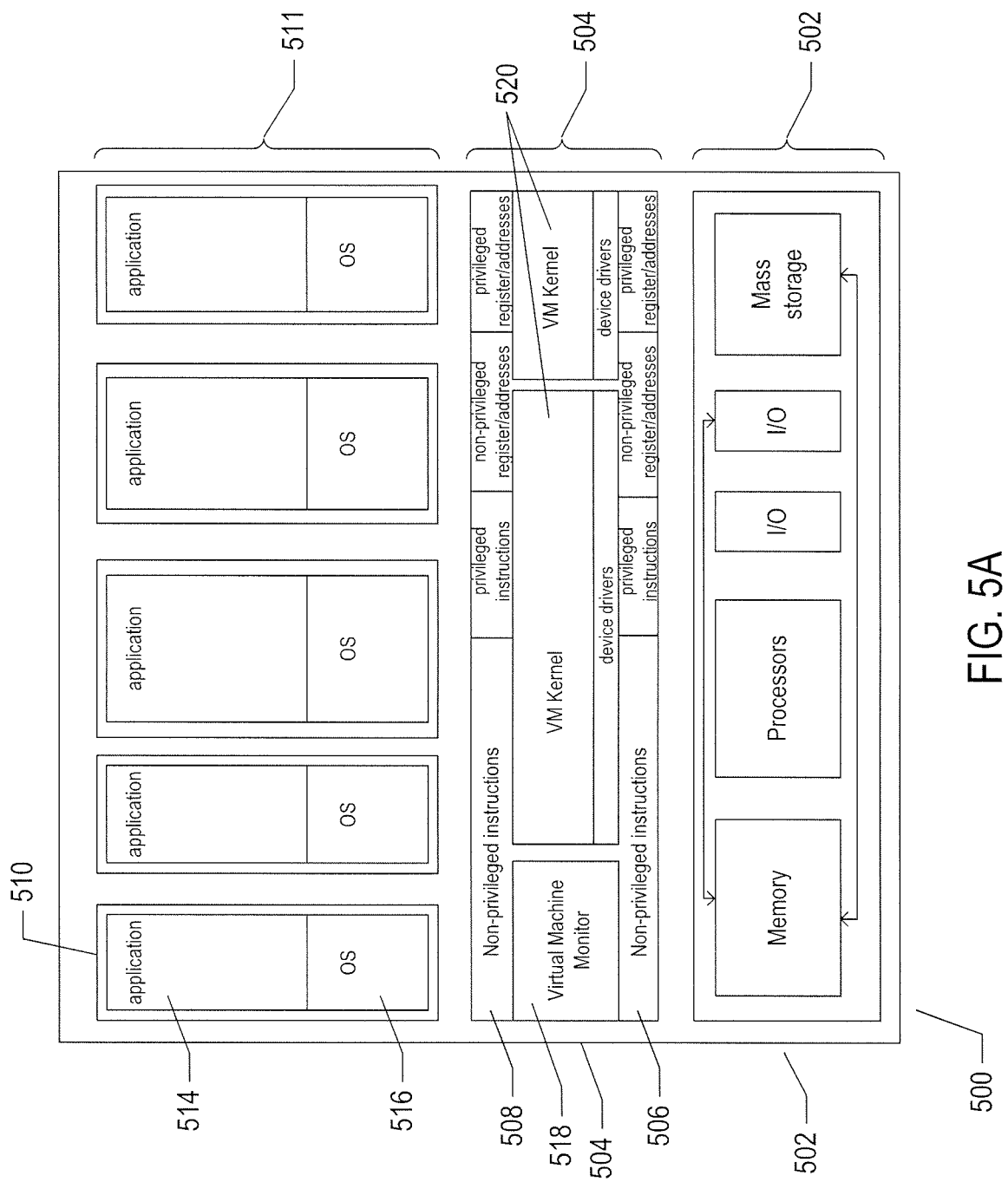
FIGS. 5A-5B show two types of virtual machine ("VM") and VM execution environments.
Figure 5B:
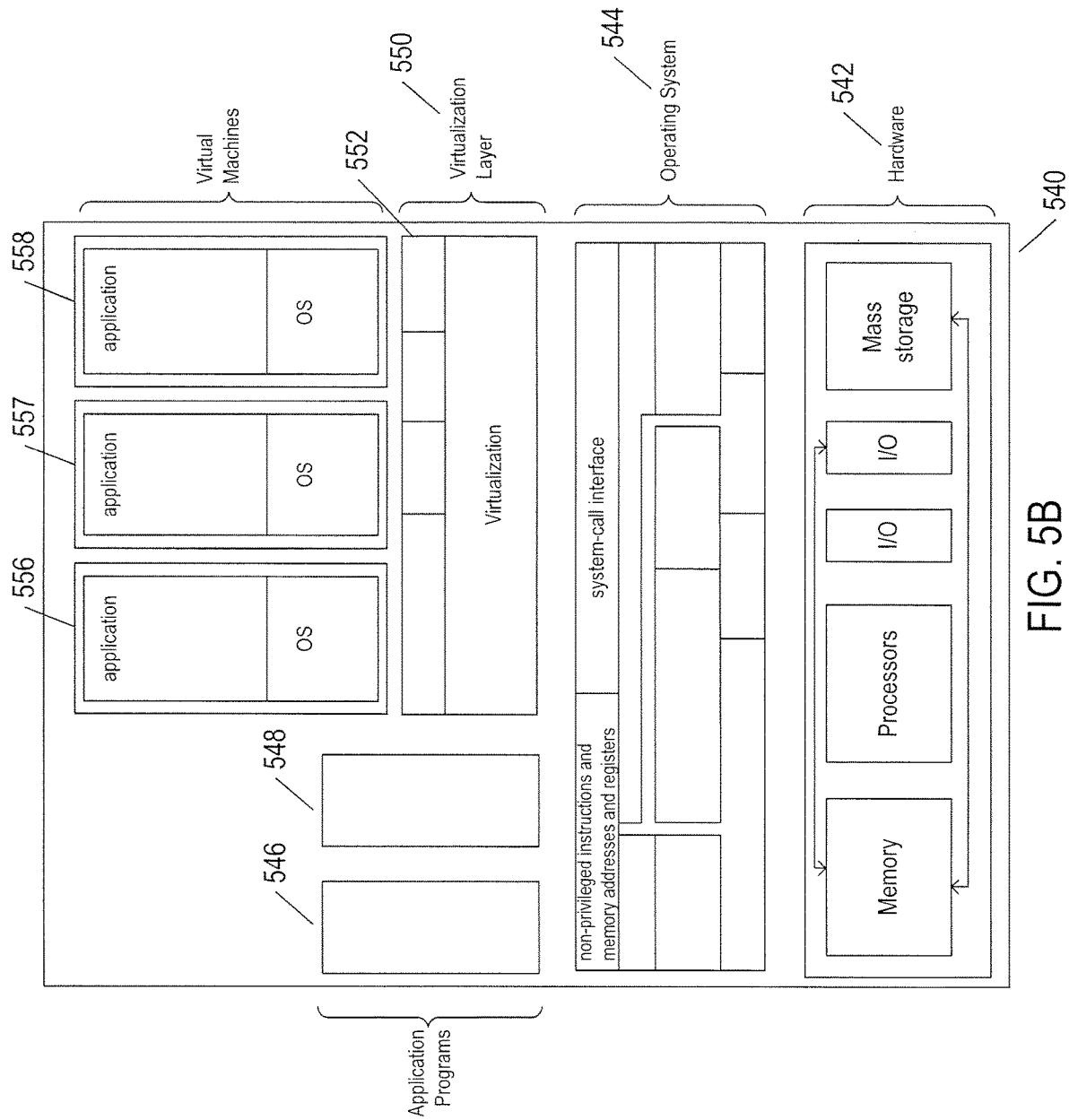

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
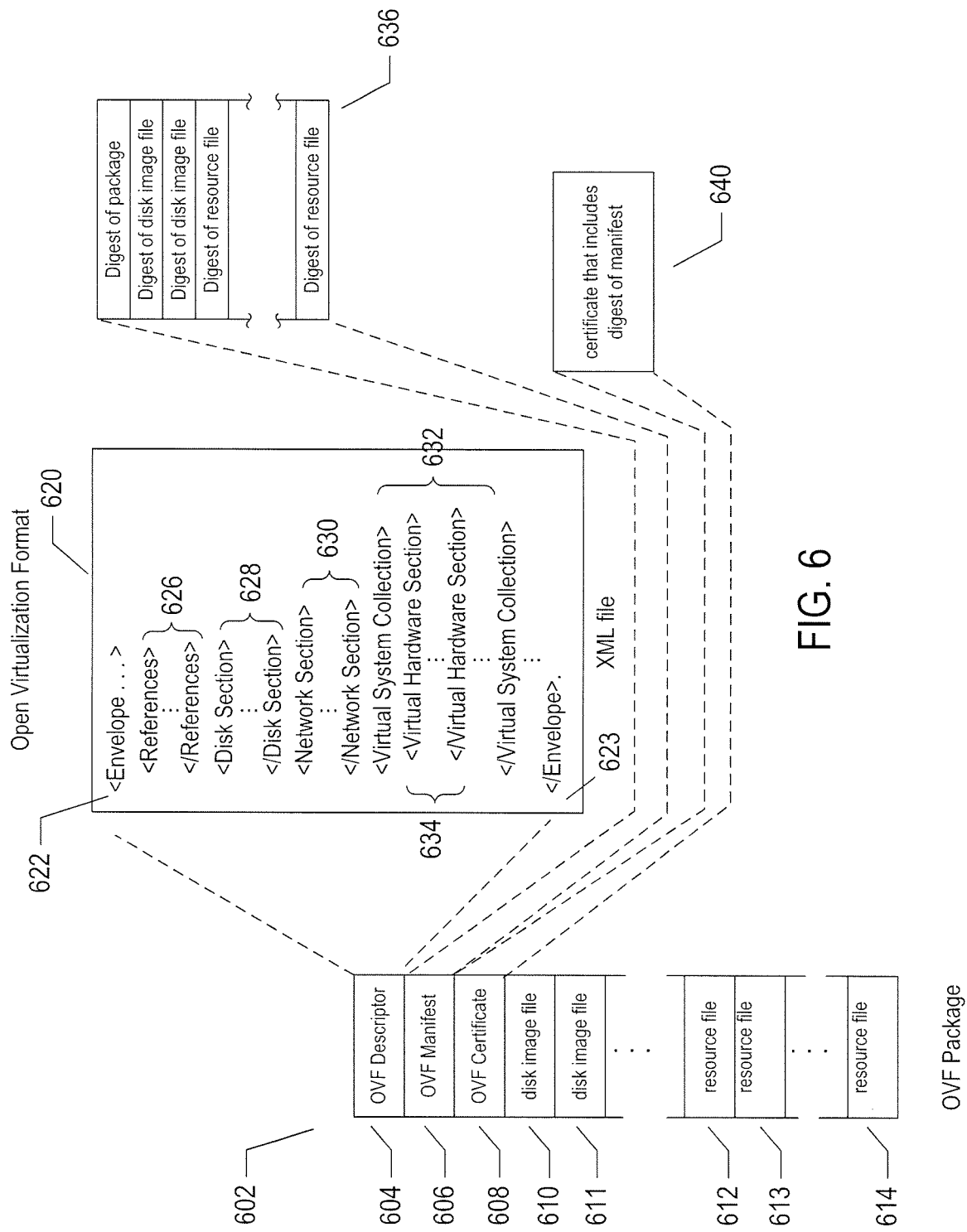
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a network section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
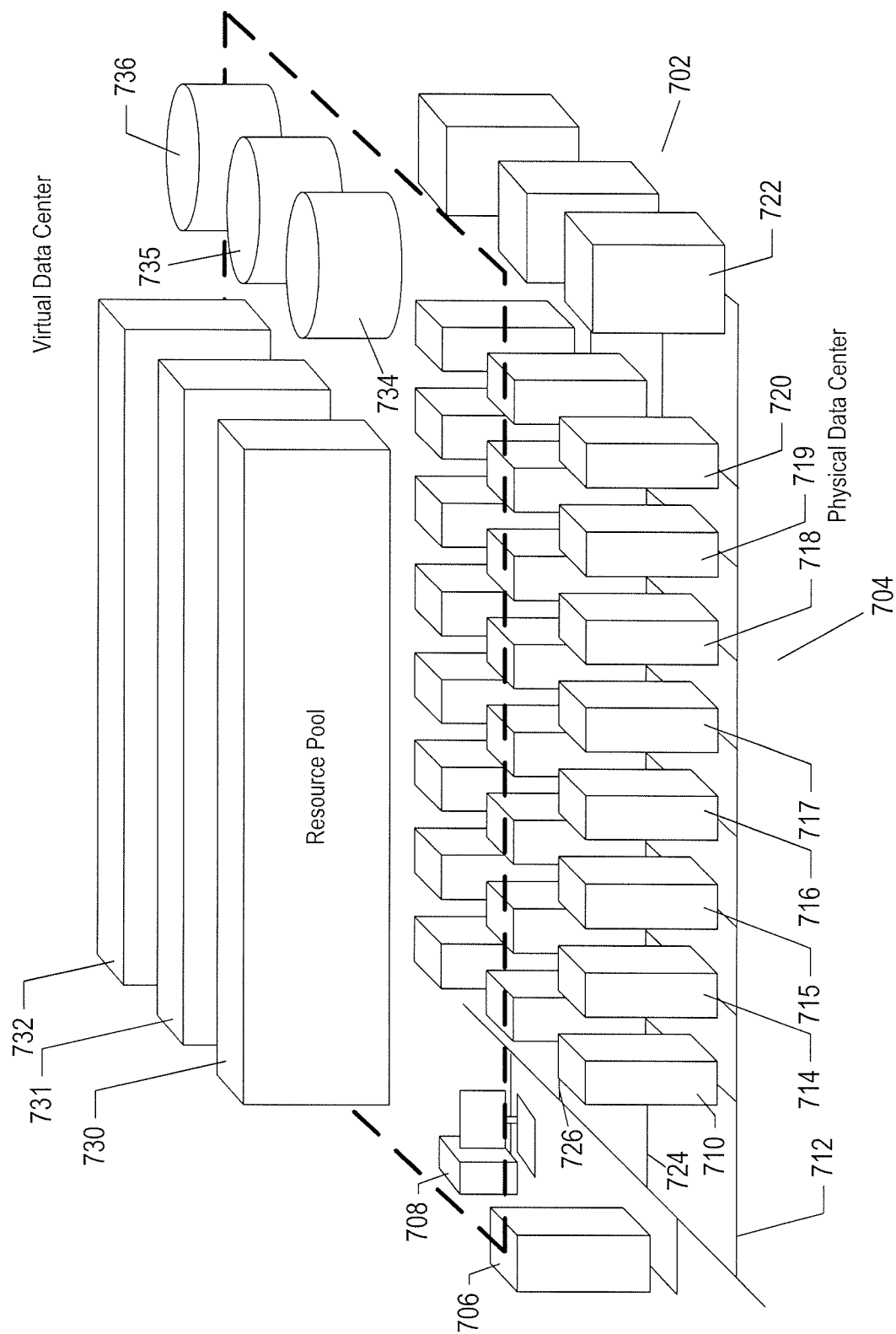
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
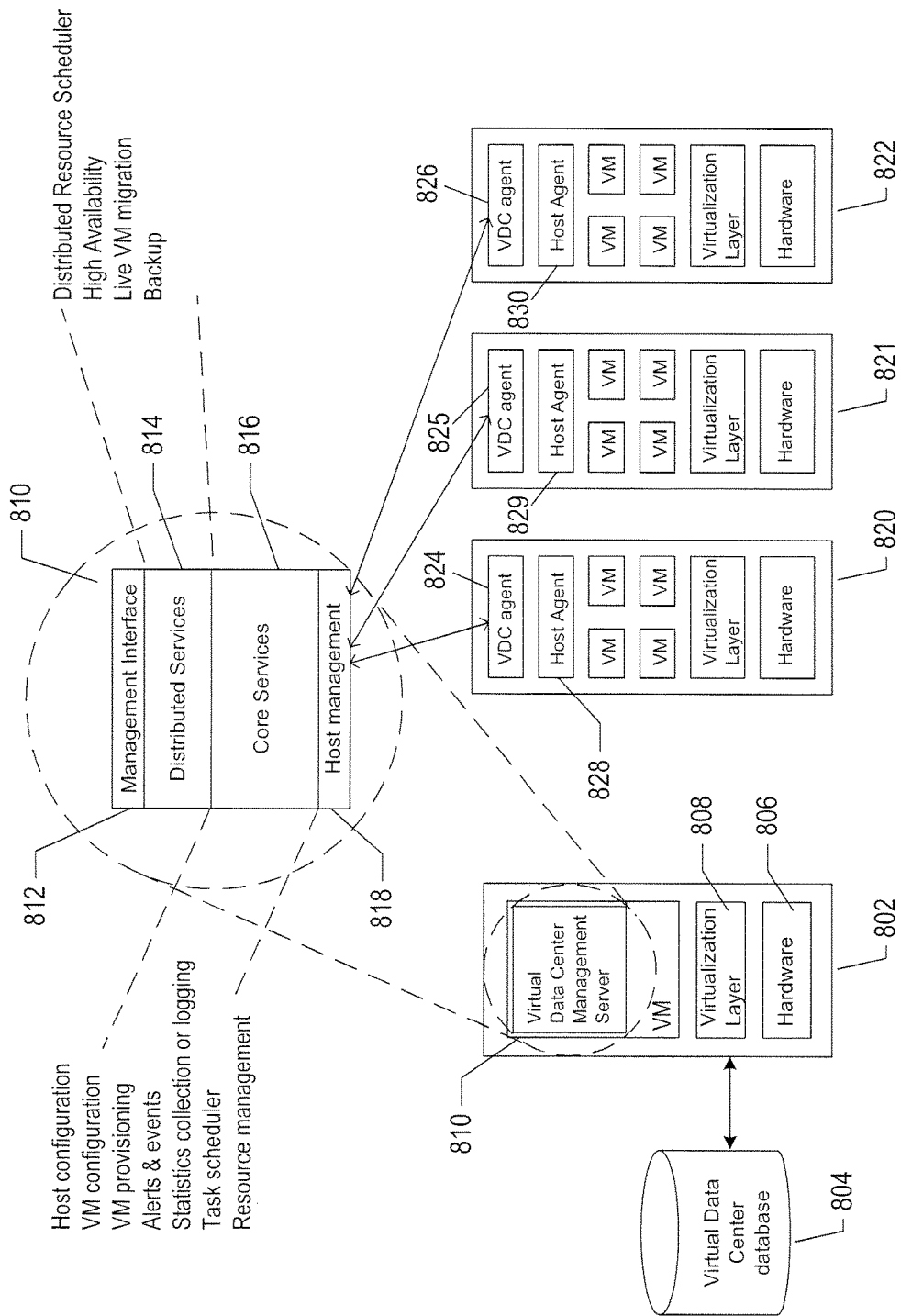
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtualization layer 808 and runs a virtual-data-center management-server VM 810 above the virtualization layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer, and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each physical server computers 820-822 also includes a host-agent VM 828-830 through which the virtualization layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for off-loading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
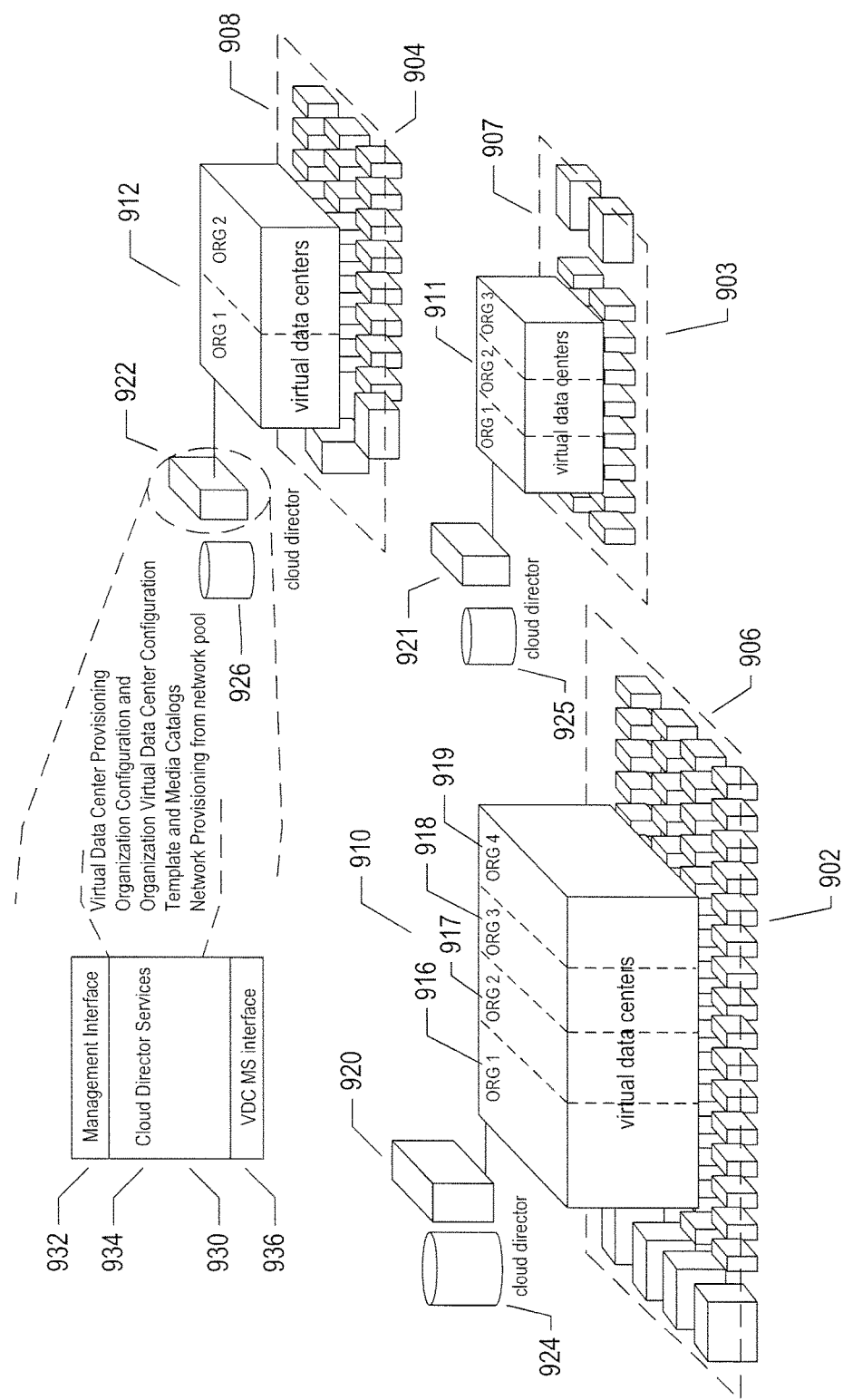
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
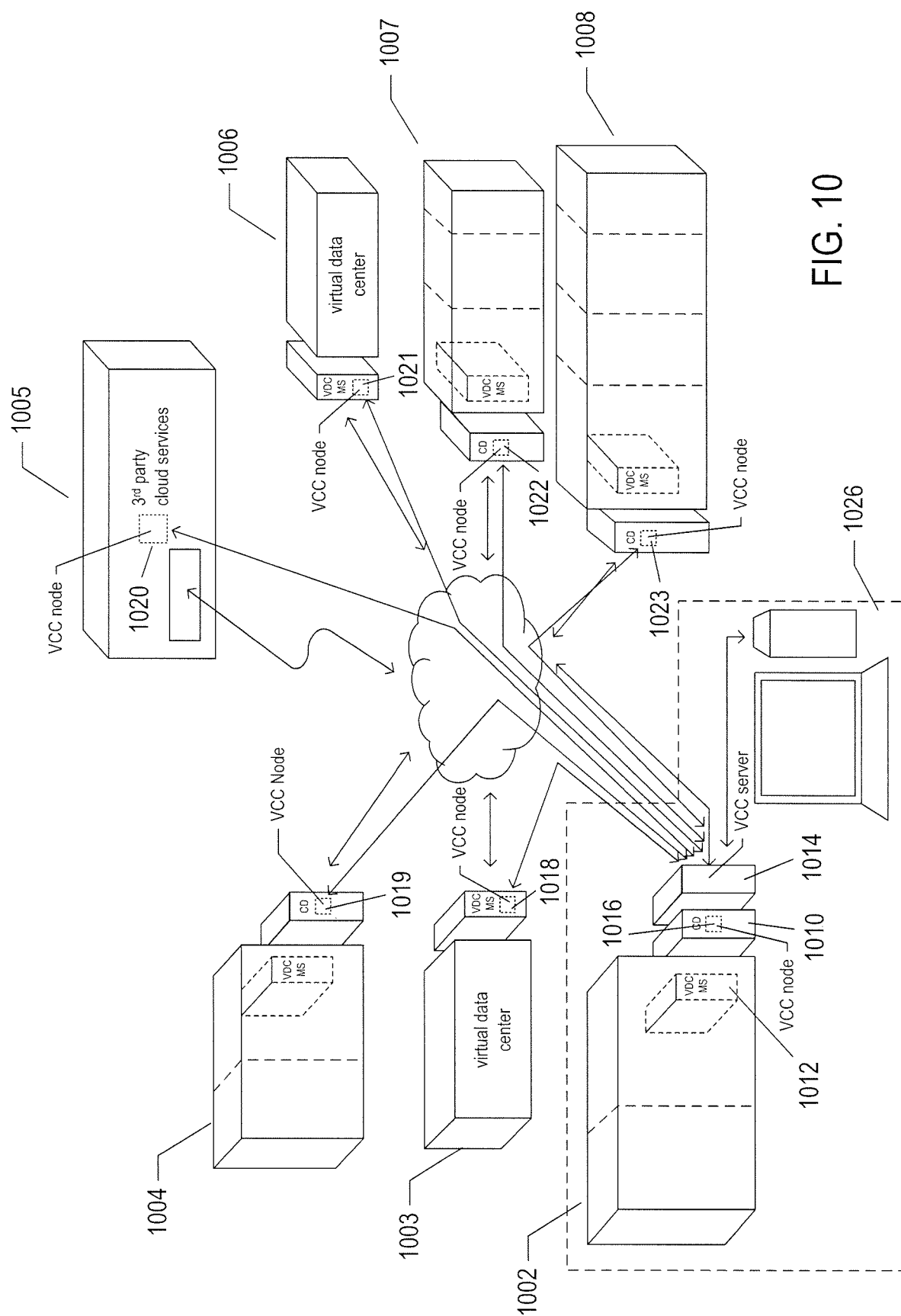
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtualization layer can simulate the hardware interface expected by any of many different operating systems, OSL virtualization essentially provides a secure partition of the execution environment provided by a particular operating system for use by containers. A container is a software package that uses virtual isolation to deploy and run one or more applications that access a shared operating system kernel. Containers isolate components of the host used to run the one or more applications. The components include files, environment variables, dependencies, and libraries. The host OS constrains container access to physical resources, such as CPU, memory and data storage, preventing a single container from using all of a host's physical resources. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
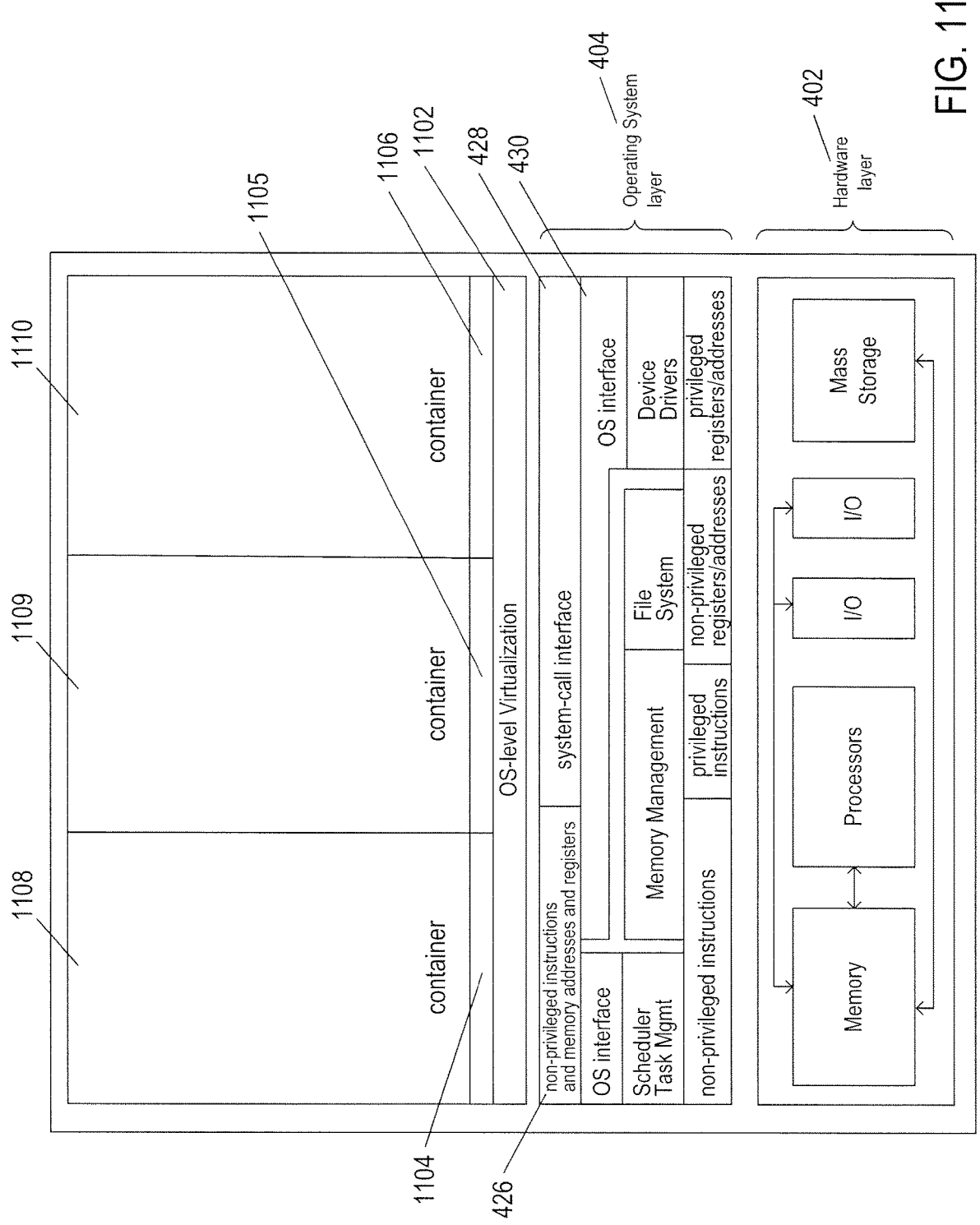
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
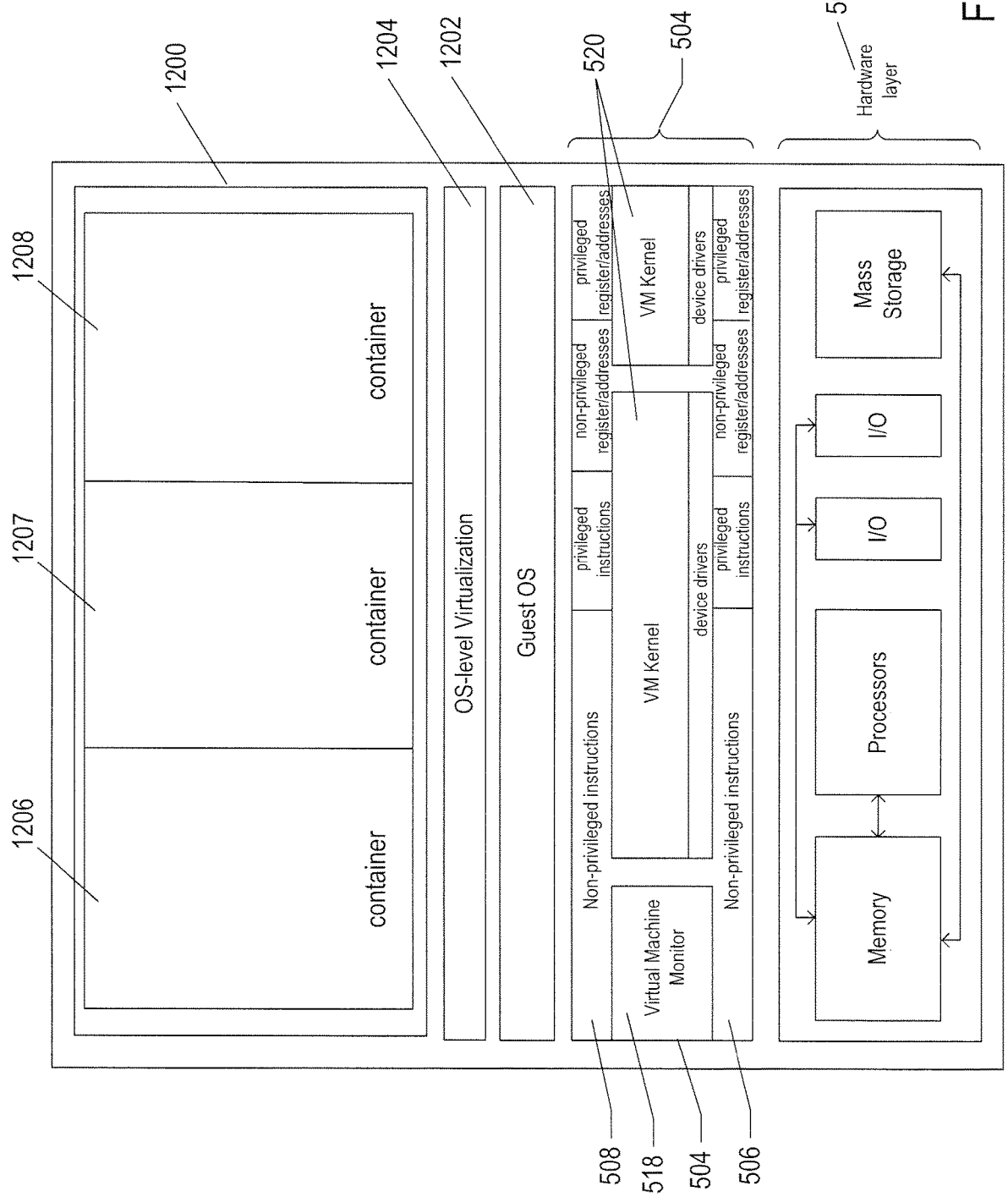
FIG. 12 shows an approach to implementing containers on a VM.

FIG. 12 shows an approach to implementing the containers on a VM. FIG. 12 shows a host computer similar to the host computer shown in FIG. 5A, discussed above. The host computer includes a hardware layer 502 and a virtualization layer 504 that provides a virtual hardware interface 508 to a guest operating system 1102. Unlike in FIG. 5A, the guest operating system interfaces to an OSL-virtualization layer 1104 that provides container execution environments 1206-1208 to multiple application programs.

Although only a single guest operating system and OSL virtualization layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1204 in FIG. 12, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtualization layer and the advantages of OSL virtualization.

Figure 13:
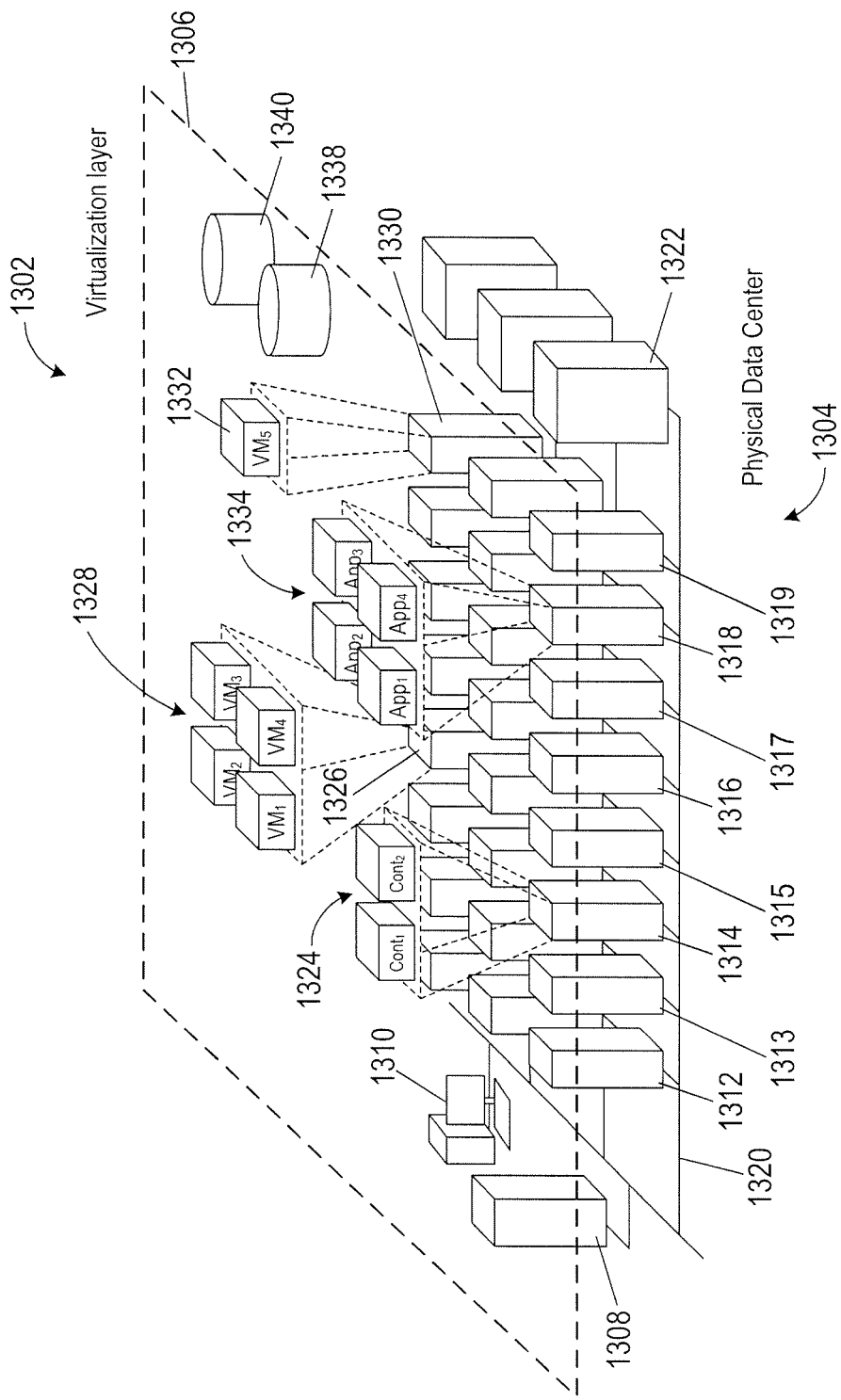
FIG. 13 shows an example of a virtualization layer located above a physical data center.

Processes and Systems for Determining Sustainability of a Virtual Infrastructure of a Distributed Computing System FIG. 13 shows an example of a virtualization layer 1302 located above a physical data center 1304. For the sake of illustration, the virtualization layer 1302 is separated from the physical data center 1304 by a virtual-interface plane 1306. The physical data center 1304 is an example of a distributed computing system. The physical data center 1304 comprises physical objects, including a management server computer 1308, any of various computers, such as PC 1310, on which a virtual-data-center ("VDC") management interface may be displayed to system administrators and other users, server computers, such as server computers 1312-1319, data-storage devices, and network devices. Each server computer is called a host. A host represents the aggregate computing and memory resources of a server computer available to the virtual infrastructure. For example, for a server computer with 32 GB of memory and four dual-core CPU's, each core with a clock speed of 4 GHz, the host has 32 GB of memory and 32 GHz of computing power available for running VMs assigned to the host The server computers may be networked together to form networks within the data center 1304. The example physical data center 1304 includes three networks that each directly interconnects a bank of eight server computers and a mass-storage array. For example, network 1320 interconnects server computers 1312-1319 and a mass-storage array 1322. Different physical data centers may include many different types of computers, networks, data-storage systems and devices connected according to many different types of connection topologies. A cluster comprises a group of server computers with connections to the same network and data storage provide an aggregate set of resources for the virtual infrastructure. A cluster represents the aggregate computing power and memory of group of connected server computers that share the same network and data storage arrays. For example, if a cluster contains eight server computers, each server computer configured with four dual-core CPUs, each core with a clock speed of 4 GHz, and 32 GB of memory, the cluster has an aggregate of 256 GHz of computing power and 256 GB of memory available for running VMs. The virtualization layer 1302 includes virtual objects, such as VMs, applications, and containers, hosted by the server computers in the physical data center 1304. The virtualization layer 1302 may also include a virtual network (not illustrated) of virtual switches, routers, load balancers, and network interface cards formed from the physical switches, routers, and network interface cards of the physical data center 1304. Many of the server computers host VMs and containers as described above with reference to FIGS. 5A, 5B, 11 and 12. For example, server computer 1314 hosts two containers 1324, server computer 1326 hosts four VMs 1328, and server computer 1330 hosts a VM 1332. Other server computers may host applications as described above with reference to FIG. 4. For example, server computer 1318 hosts four applications 1334. The virtual-interface plane 1306 abstracts the resources of the physical data center 1304 to one or more VDCs comprising the virtual objects and one or more virtual data stores, such as virtual data stores 1338 and 1340. For example, one VDC may comprise VMs 1328 and virtual data store 1338.

In the following discussion, a resource may be a physical resource of a server computer or a distributed computing system, such as, but are not limited to, a processor, a core, memory, a network connection, network interface, data-storage device, a mass-storage device, a switch, a router, and any other component of the physical data center 1304. Resources of a server computer and clusters of server computers may form a resource pool for creating virtual resources of a virtual infrastructure used to run virtual objects. A resource pool is a partition of computing and memory resources from a host or a cluster. A resource may be a virtual resource, which may have been formed from physical resources used by a virtual object. For example, a resource may be a virtual processor formed from one or more cores of a multicore processor, virtual memory formed from a portion of physical memory, virtual storage formed from a sector or image of a hard disk drive, a virtual switch, or a virtual router. An object may be a physical object or a virtual object. Examples of physical objects include a server computer, network device, a workstation, and a PC. Examples of virtual objects include an application, a VM, a virtual network device, an application, and a container. A virtual infrastructure comprises the virtual resources and virtual objects of a data center, the virtual resources and virtual objects of a cluster, or the virtual resources and virtual objects of a single server computer.

With the increasing growth in the number and size of data centers, data center owners and managers have become increasingly concerned with the large energy consumption and associated $CO_2$ emissions that result from operating data centers. Automated processes and systems described herein are directed to decreasing energy consumption and associated $CO_2$ emissions while maintaining sustainability of a virtual infrastructure of a distributed computing system. Sustainability of a virtual infrastructure is achieved by using available resources in a manner that does not completely deplete the virtual infrastructure and maintains a balance between supply and demand for infrastructure resources. Processes and systems described below enable sustainability to be incorporated into the management of infrastructure resources of a distributed computing system.

Automated processes and systems may be implemented in a monitoring server that collects numerous streams of time-dependent metric data generated by various different metric sources. Each stream of metric data is a sequence of time series data generated by a metric source. A metric source may be an object, an operating system of an object, or a resource. A stream of metric data associated with a resource comprises a sequence of time-ordered metric values that are recorded in a data-storage device at spaced points in time called "time stamps." Processes and systems described below determine sustainability of a virtual infrastructure based on power and energy metrics of the various objects and resources of the distributed computing system. A power metric is a stream of time dependent power data denoted by $$(P_i)_{i=0}^N = (P(t_i))_{i=0}^N \qquad (1a)$$

where $P_i = P(t_i)$ is a power metric value;

$t_i$ is a time stamp indicating when the power metric value was recorded in a data-storage device; and N is the number of power metric values in the sequence. Each power metric value, $P_i$, is the rate at which electric power is consumed by an object or a resource at a point in time. Power metric values may be recorded in watts (W). Power metric values of a power metric of an object comprising a plurality of power consuming resources may be calculated by $$P_i = \sum_{k=1}^{K} P_{ik} \qquad (1b)$$

where $1 \leq k \leq K$;

$P_{ik}$ is the power consumed by the k-th resource at about the time $t_i$; and K is the number of power consuming resources of the object.

For example, a power metric for a VM may be computed as a sum of the power metrics of the processors, memory, network, and disk space used by the VM at the time stamp $t_i$.

An energy metric is a stream of time dependent energy data denoted by $$(E_i)_{i=1}^{N} = (E(t_i))_{i=1}^{N} \qquad (2)$$

where $E_i = E(t_i)$ is a metric energy value.

The energy metric is the amount of power consumed by an object or a resource over a time period. Energy metric values may be recorded in watt-hours (Wh). Energy metric values of the energy metric may be calculated from the power metric by $$E = \sum_{i=1}^{N} P_i (t_i - t_{i-1}) \qquad (3a)$$

where $1 \leq i \leq N$.

An energy metric of an object comprising a plurality of energy consuming resources, such as a server computer, may be calculated by $$E = \sum_{k=1}^{K} E_k = \sum_{k=1}^{K} \sum_{i=1}^{N} P_{ik}(t_i - t_{i-1}) \qquad (3b)$$

where $E_k$ is the energy consumed by the k-th resource of the object over a time period $[t_0, t_N]$.

For example, a server computer comprises numerous energy consuming resources, such as processors, memory, network interface, and a data-storage device. The energy consumed by the server computer is a sum of the energy consumed by the processors, memory, network interface, and data-storage device.

Figure 14A:
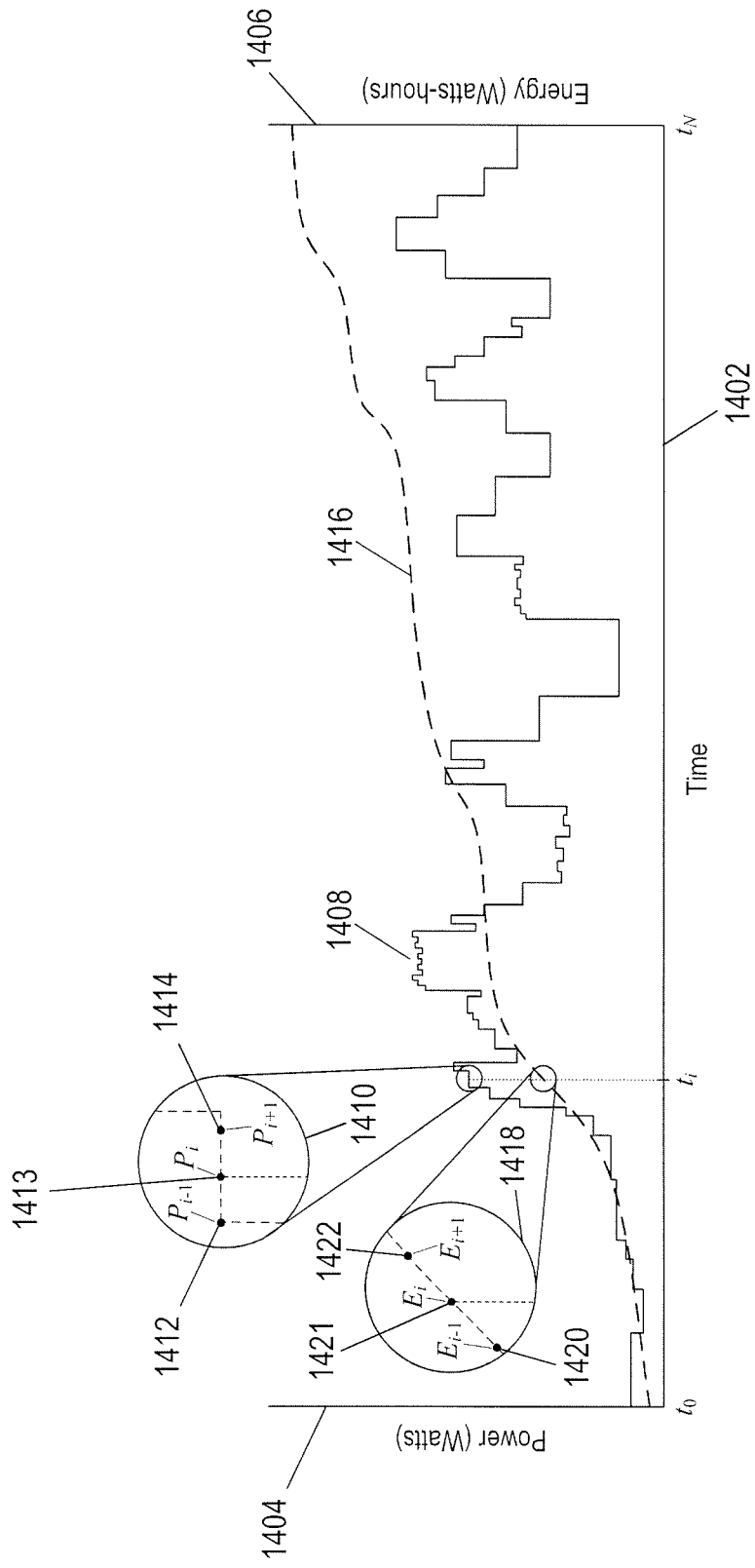
FIG. 14A shows a plot of an example power metric and an associated energy metric of an object or a resource of a distributed computing system.

FIG. 14A shows a plot of an example power metric and an associated energy metric of an object of a distributed computing system. Horizontal axis 1402 represents a time interval with end points $t_0$ and $t_N$. Vertical axis 1404 represents a range of power metric values in watts. Vertical axis 1406 represents a range of energy metric values in watt-hours. Curve 1408 represents a power metric as time series data. FIG. 14A includes a magnified view 1410 of three consecutive metric values represented by points 1412-1414. Each point represents power consumption of the object at a corresponding time stamp. For example, points 1412-1414 represent three consecutive power metric values $P_{i-1}$, $P_i$, and $P_{i+1}$, recorded in a data-storage device at corresponding time stamps $t_{i-1}$, $t_i$, and $t_{i+1}$. Dashed curve 1416 represents an energy metric as time series data. FIG. 14A includes a magnified view 1418 of three consecutive energy metric values represented by points 1420-1422. Each point represents power consumption of the object at a corresponding time stamp. For example, points 1420-1422 represent three consecutive energy metric values $E_{i-1}$, $E_i$, and $E_{i+1}$ recorded in a data-storage device at corresponding time stamps $t_{i-1}$, $t_i$, and $t_{i+1}$. The example power and energy metrics represent power and energy consumed by the object or resource over the time period $[t_0, t_N]$. For example, the power and energy metrics may represent power and energy consumed by a multicore processor or memory of a server computer over the time period. The power and energy metrics may represent power and energy consumed by a virtual object (e.g., a VM), a host, a cluster, or a data center over the time period.

Figure 14B:
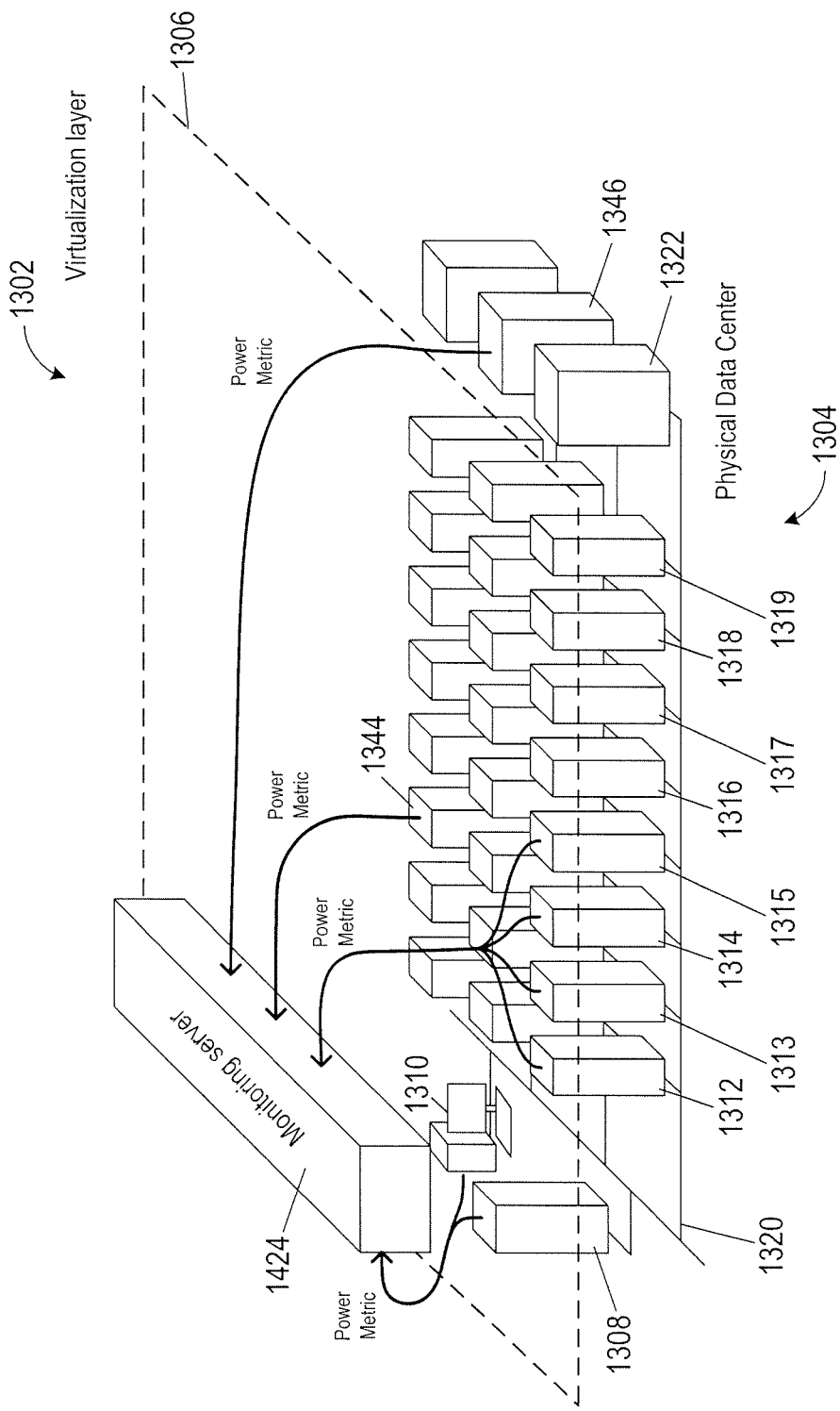
FIG. 14B shows a monitoring server that collects power metrics from physical and virtual resources of a distributed computing system.

FIG. 14B shows a monitoring server 1424 collecting power metrics from physical and virtual resources. The monitoring server 1424 may be implemented in one or more VMs to collect and process the power metrics as described below. Directional arrows represent power metrics sent from server computers and a data-storage device to the monitoring server 1424. For example, PC 1310, server computers 1308 and 1312-1315, and mass-storage array 1346 send power metrics to the monitoring server 1424. Clusters of server computers dedicated to hosting VMs of a VDC may also send power metrics to the monitoring server 1424, such as cluster of server computers 1312-1315 that send a single power metric for server computers 1312-1315 to the monitoring server 1424. The monitoring server 1424 may also collect overhead power metrics from devices and systems that support operations of the distributed computing system, such as air conditioning, heating, and lighting.

Processes and systems compute sustainability metrics based on the power and energy metrics. The sustainability metrics can be used to assess sustainability of a distributed computing system. Sustainability metrics include a $CO_2$ emissions metric of an energy consuming object or resource given by $$CO_2 \text{ Emission} = E(kWh) \times 707.15 \text{ g } CO_2/kWh \qquad (4)$$

where

E is the energy consumed by an object or a resource over the time period $[t_0, t_N]$ according to Equations (3a) or (3b); and 707.15 g $CO_2$/kWh is a $CO_2$ emissions factor.

Sustainability metrics include the amount of $CO_2$ emissions produced to run a host over the time period:

$$\text{Host}(CO_2 \text{ Emission}) = E(\text{Host})(Wh) \times 0.707 \text{ g } CO_2/Wh \qquad (5)$$

where E (Host) is the energy consumed by a server computer over the time period $[t_0, t_N]$ according to Equation (3b).

Other sustainability metrics include $CO_2$ emissions produced to run a cluster over the time period:

$$\text{Cluster}(CO_2 \text{ Emission}) = \sum_{i=1}^{N_{CH}} \text{Host}_i (CO_2 \text{ Emission}) \qquad (6)$$

where $N_{CH}$ is the number of server computers in a cluster. Other sustainability metrics include $CO_2$ emissions produced to run a data center over the time period:

$$\text{Datacenter (CO}_2 \text{ Emission)} = \sum_{i=1}^{N_{DC}} \text{Cluster}_i \text{ (CO}_2 \text{ Emission)} \quad (7a)$$

where $N_{DC}$ is the number of clusters in a data center. Alternatively, $CO_2$ emissions produced to run hosts of a data center may be computed from the $CO_2$ emissions produced to run each host in the data center:

$$\text{Datacenter (CO}_2 \text{ Emission)} = \sum_{i=1}^{N_{DH}} \text{Host}_i \text{ (CO}_2 \text{ Emission)} \quad (7b)$$

where $N_{DH}$ is the number of server computers in a data center.

Processes and systems include computing power wasted metrics for the data center, clusters, hosts, and other objects based on power wasted by idle virtual objects. Power wasted by a virtual object is given by $$\text{Power Wasted }(VObject) = \begin{cases} \text{Idle Virtual Object} & P_{wasted}(VObject) \\ \text{Busy Virtual Object} & 0 \end{cases} \quad (8)$$

where $P_{wasted}(VObject)$ is the power used by an idle virtual object computed according to Equation (1b).

An idle virtual object remains running and consuming power and energy even though the virtual object is no longer in use. Idle VMs, for example, consume power and energy because idle VMs continue to use processors, memory, network, and storage resources even though the VM is not in use. An idle virtual object may be determined when average resource usage by the virtual object falls below a threshold for a time period. Average resource usage may be determined by recording resource usage values at regular times within the time period followed by averaging the resource usage values. For example, average processor usage may be calculated based on CPU or core utilization recorded at regular times within the time period; average memory usage may be calculated based on an amount of memory is use at regular time intervals in the time period; average network usage may be calculated based on average number of data packets sent and received within the time period; and average disk usage may be calculated based on the average number of send and retrieve calls to data storage within the time period. A virtual object may be identified as idle when one or more of the average processor usage, average memory usage, average network usage, and average disk usage are less than corresponding thresholds for a time period. The time period may be hours or days. For example, the time period may be 12 hours, 24 hours, 2 days, or 3 days.

Processes and systems compute power wasted metrics of a host, cluster, or a data center based on the power wasted by the idle virtual objects running in the host, cluster, or the data center over the time period. Power wasted by a host may be computed by $$\text{Power Wasted (Host)} = \sum_{i=1}^{N_{VO}} P_{wasted}(VObject_i) \quad (9)$$

where

Power Wasted ($VObject_i$) is the power wasted by the i-th idle virtual object running on the host over the time period; and $N_{VO}$ is the number of idle virtual objects running on the server computer.

Power wasted by a cluster may be computed by $$\text{Power Wasted (Cluster)} = \sum_{i=1}^{N_{DH}} \text{Power Wasted (Host}_i) \quad (10)$$

where Power Wastage ($Host_i$) is the power wasted by the i-th host of the cluster over the time period.

Power wasted in a data center may be computed by $$\text{Power Wasted (Datacenter)} = \sum_{i=1}^{N_{DC}} \text{Power Wasted (Cluster}_i) \quad (11)$$

where Power Wasted ($Cluster_i$) is the power wasted by the i-th cluster over the time period.

Equations (8)-(11) are sustainability metrics that represent the amount of power wasted resources of a virtual infrastructure. Recommendations and/or automated measures to reclaim capacity without causing stress or performance degradation of the hosts, clusters, and data center are based on the power wasted metrics computed in Equations (9)-(11). The recommendations include consolidating busy virtual objects onto fewer server computers, reassigning resources used by idle virtual objects to busy virtual objects, powering down unused server computers, or powering down server computers running only idle virtual objects. For example, recommendations may be generated and/or automated measures that may be performed to reclaim capacity when one or more of the power wasted metrics given by Equations (9)-(11) are greater than associated thresholds:

$$\text{Power Wasted(Host)} \geq \text{Threshold}_{Host} \quad (12)$$

where $\text{Threshold}_{Host}$ is a host power wasted threshold, $$\text{Power Wasted(Cluster)} \geq \text{Threshold}_{Cluster} \quad (13)$$

where $\text{Threshold}_{cluster}$ is a cluster power wasted threshold, and $$\text{Power Wasted(Datacenter)} \geq \text{Threshold}_{Datacenter} \quad (14)$$

where $\text{Threshold}_{Datacenter}$ is a data center power wasted threshold.

Processes and systems determine the reclaimable capacity of each resource, such as a processor, memory, and disk space, used by idle virtual objects in the virtual infrastructure. Reclaimable capacity of a resource is the amount of the resource that is not in use as given by $$\text{ReclaimCap(R)} = TC - RC - RU \quad (15)$$

where

R represents a resource;

TC is the total capacity of the resource;

RC is the reserved capacity of the resource to avoid failure or reserved capacity for an upcoming workload; and RU is the amount of the resource in use.

The variable R represents a type of resource, such as a processor, a core of a multicore processor, memory, or disk space. Equation (15) gives the reclaimable capacity of a single resource. The reclaimable capacities of resources of idle virtual objects of a virtual infrastructure may be reclaimed and provisioned for use by other virtual objects of the virtual infrastructure. The total reclaimable capacity for a host that satisfies the condition in Equation (12) is given by $$ReclaimCap_{Host}(R) = \sum_{i=1}^{N_R} ReclaimCap(R_i) \quad (16)$$

where
$R_i$ is the i-th resource;
$ReclaimCap(R_i)$ is the reclaimable capacity of the i-th resource; and
$N_R$ is the number of aggregate resources of the same type for the host.

The resources denoted by $R_i$ are the same type of resource. For example, a host may have eight processors denoted by $R_i$, where i=1, 2, ..., 8 and $N_R$=8. Equation (16) gives the total reclaimable capacity of the eight processors. The total reclaimable capacity for a cluster that satisfies the condition in Equation (13) is given by $$ReclaimCap_{Cluster}(R) = \sum_{i=1}^{N_C} ReclaimCap(R_i) \quad (17)$$

where
$R_i$ is the i-th of the resource;
$ReclaimCap(R_i)$ is the reclaimable of the i-th resource; and
$N_C$ is the number of aggregate resources of the same type for the cluster.

The total reclaimable capacity for a data center that satisfies the condition in Equation (14) is given by $$ReclaimCap_{Datacenter}(R) = \sum_{i=1}^{N_D} ReclaimCap(R_i) \quad (18)$$

where
$R_i$ is the i-th resource;
$ReclaimCap(R_i)$ is the reclaimable of the i-th resource; and
$N_D$ is the number of aggregate resources of the same type for the data center.

Recommendations for reclaiming capacity may be displayed in a graphical user interface or automated measures to reduce $CO_2$ emissions and power wastage may be executed, such as powering down server computers and deleting, powering off, or migrating idle virtual objects to other hosts followed by spinning up virtual objects to run on the resources of the one or more hosts that were previously reserved for the idle virtual object. The recommendations may have been determined by IT administrators when correcting similar power wastage problems in the past. For example, automated measures include that if a virtual object running on one or more server computers is idle, the capacity of the resources used by the virtual object may be reclaimed by deleting, powering off, or migrating the idle virtual object to another host followed by assigning the resources to other virtual objects or to newly created virtual objects.

Processes and systems generate a graphical user interface ("GUI") that may be displayed on a monitor of an IT administrator console, such as PC 1310 in FIG. 13. The GUI displays windows with interactive graphical icons and buttons that enable users, such as IT administrators, to view sustainability metrics, power wasted metrics, alerts, and recommendations for reducing $CO_2$ emissions and power wastage within a distributed computing system. The GUI may also allow IT administrators to select remedial measures for reducing $CO_2$ emissions and power wastage within the distributed computing system.

FIGS. 15-22 show examples of windows, icons, and buttons of a GUI that enables a user to view sustainability metrics, power usage metrics, reclaimable resources, alerts, and recommendations for reducing $CO_2$ emissions and power wastage within a distributed computing system. Each window includes Home, Dashboard, and Alerts buttons located along a menu bar to enable a user to select Home windows, Dashboard windows, and Alerts windows as described below.

Figure 15:
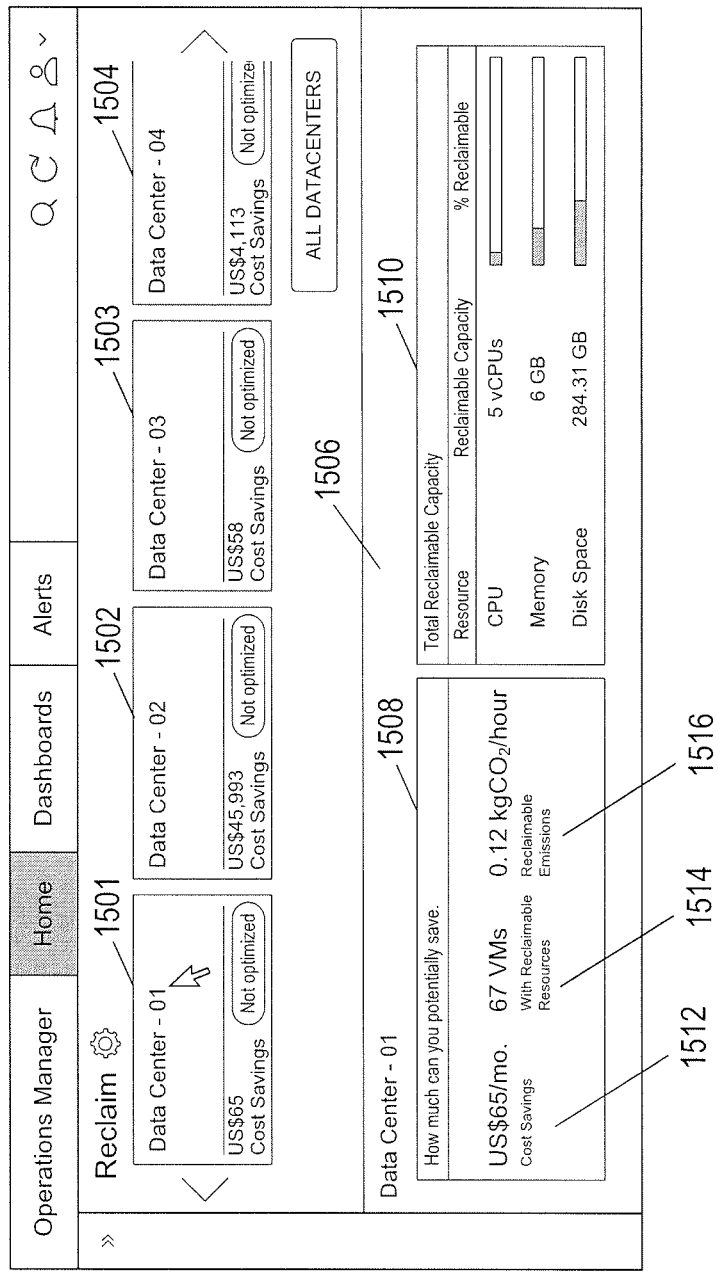

FIG. 15 shows content of an example home window that displays data centers of a distributed computing system in data center icons 1501-1504 and a split window that reveals potential savings and total reclaimable capacity of a user selected data center. Each data center icons displays the name of a data center. For example, data center icon 1501 displays the name of the data center "Data Center-01." Clicking on a data center icon, such as data center icon 1501, displays in a split window 1506 with sustainability information regarding the select data center. For example, split window 1506 displays potential savings box 1508 and a total reclaimable capacity box 1510. Potential savings box 1508 list the cost savings 1512, number of idle VMs with reclaimable resources 1514, and reclaimable emissions 1516. Total reclaimable capacity box 1510 lists total reclaimable capacity of CPU, memory, and disk space used by idle VMs and displays a bar graph indicating the percentage of reclaimable capacities of resources used by the idle VMs as described above with reference to Equation (16).

Figure 16:
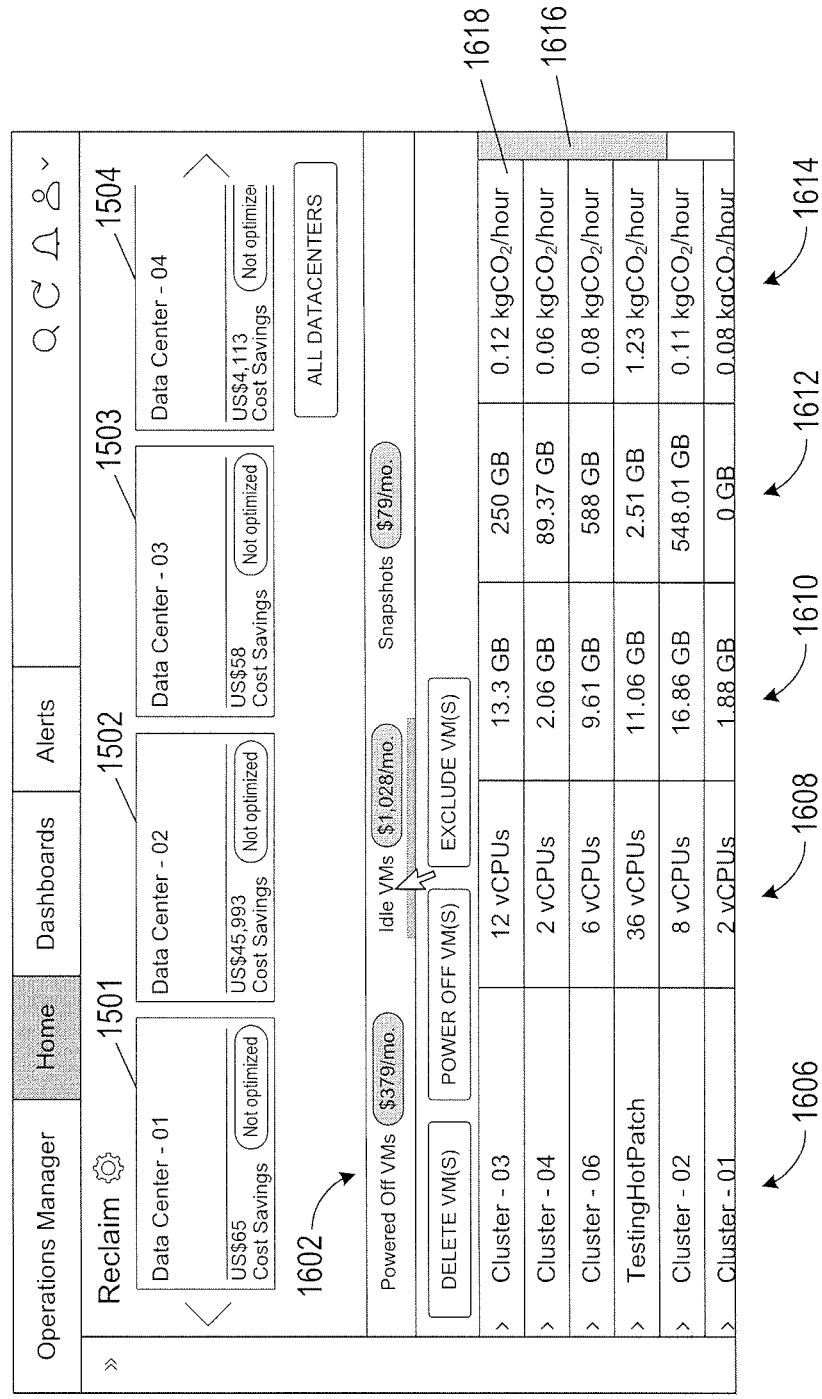

FIG. 16 shows content of an example home window that displays the data centers of a distributed computing system in data center icons 1501-1504 and a split window that reveals clusters of server computers and rates of $CO_2$ emissions associated with each cluster. In this example, the home window includes a split window 1602 that displays a list of clusters of server computers 1604 of the data center "Data Center-01" and lists of associated virtual CPU usage 1606, virtual memory usage 1608, virtual disk space 1610, and rates of $CO_2$ emissions 1612. The rates of $CO_2$ emissions 1612 are calculated for each cluster using Equation (6) divided a time period (e.g., 6 hours, 12 hours, 18 hours, or 24 hours). The split window 1602 includes a scroll bar 1616 that enables a user to scroll up and down to view virtual CPU usage, virtual memory usage, virtual disk space, and the rate of $CO_2$ emission for each cluster. For example, the split window 1602 reveals in entry 1618 for the rate of $CO_2$ emissions associated with running the cluster "Cluster-03." A split window may also include entries that display rate of $CO_2$ emissions for hosts or for each data center computed according to Equation (7a) or Equation (7b).

Figure 17A:
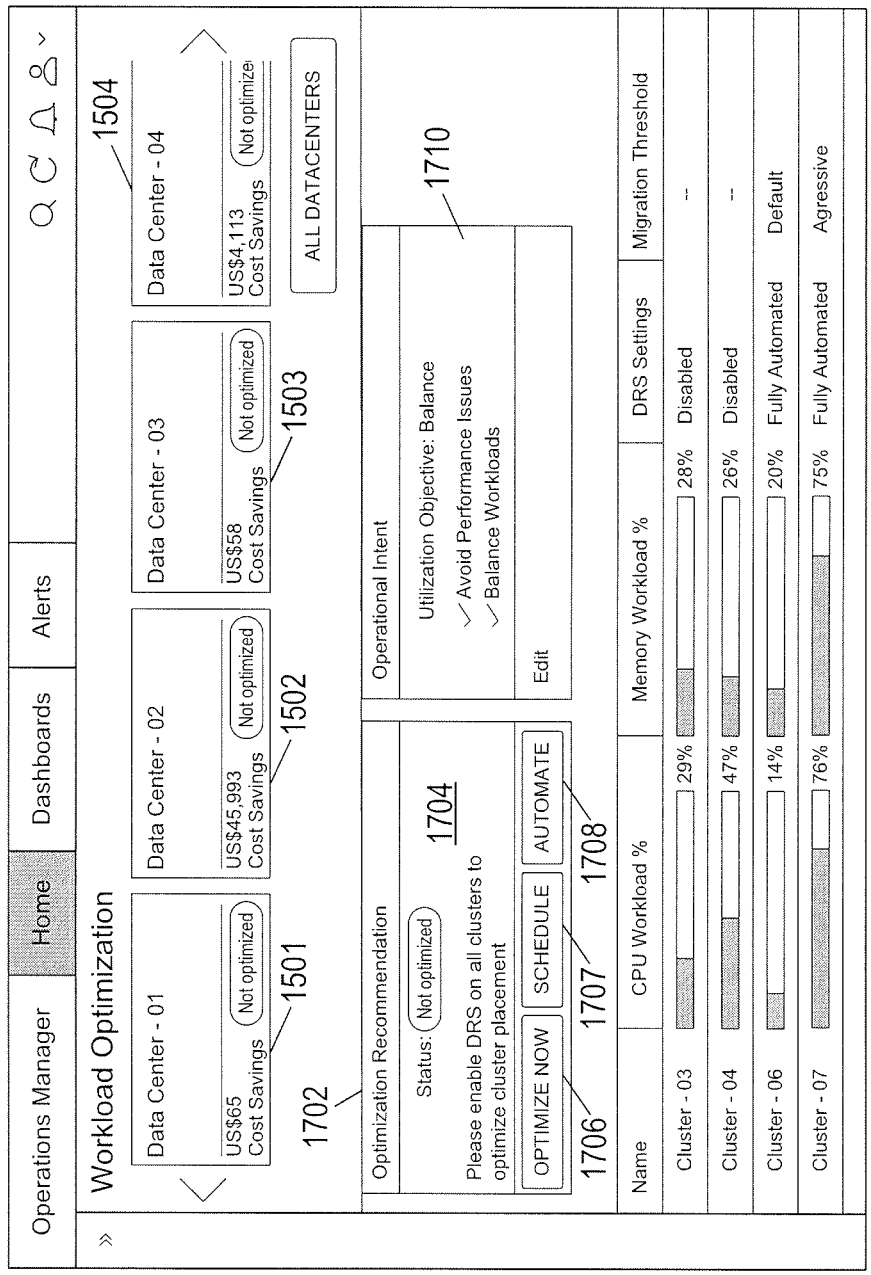
Figure 17B:
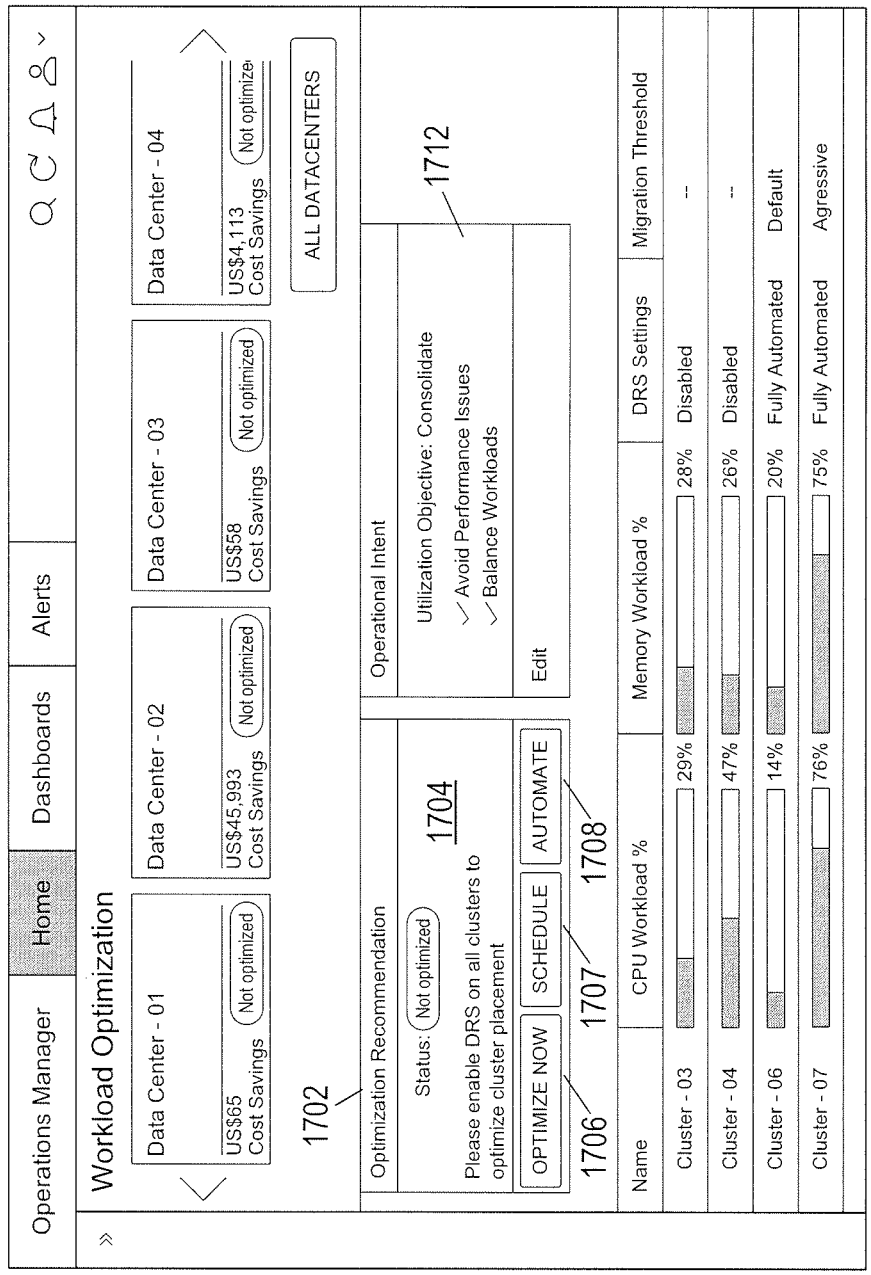

FIGS. 17A-17B show content of an example home window that displays data centers of a distributed computing system in data center icons 1501-1504 and a split window 1702 that reveals options for distributing resources. In FIGS. 17A-17B, split window 1702 displays a box 1704 with buttons 1706-1708 for executing a distributed resource scheduler ("DRS"). The DRS enables user to select balanced or consolidated workloads for clusters. In FIG. 17A, the user has selected a balance utilization of the resources of a cluster as indicated in box 1710. Balance optimizes workloads of virtual objects across the resource pool of a cluster over reducing energy consumption and lowering $CO_2$ emissions of the cluster. Balance guarantees appropriate resources are available to virtual objects running on the cluster and may deploy new capacity to the cluster to avoid service disruptions. In FIG. 17B, the user has selected a consolidate utilization of the resources as indicated in box 1712. Consolidate reduces energy usage by powering off or deleting idle virtual objects and migrates virtual objects to run on fewer server computers, thereby reducing energy consumption and lowering $CO_2$ emissions.

Figure 18:
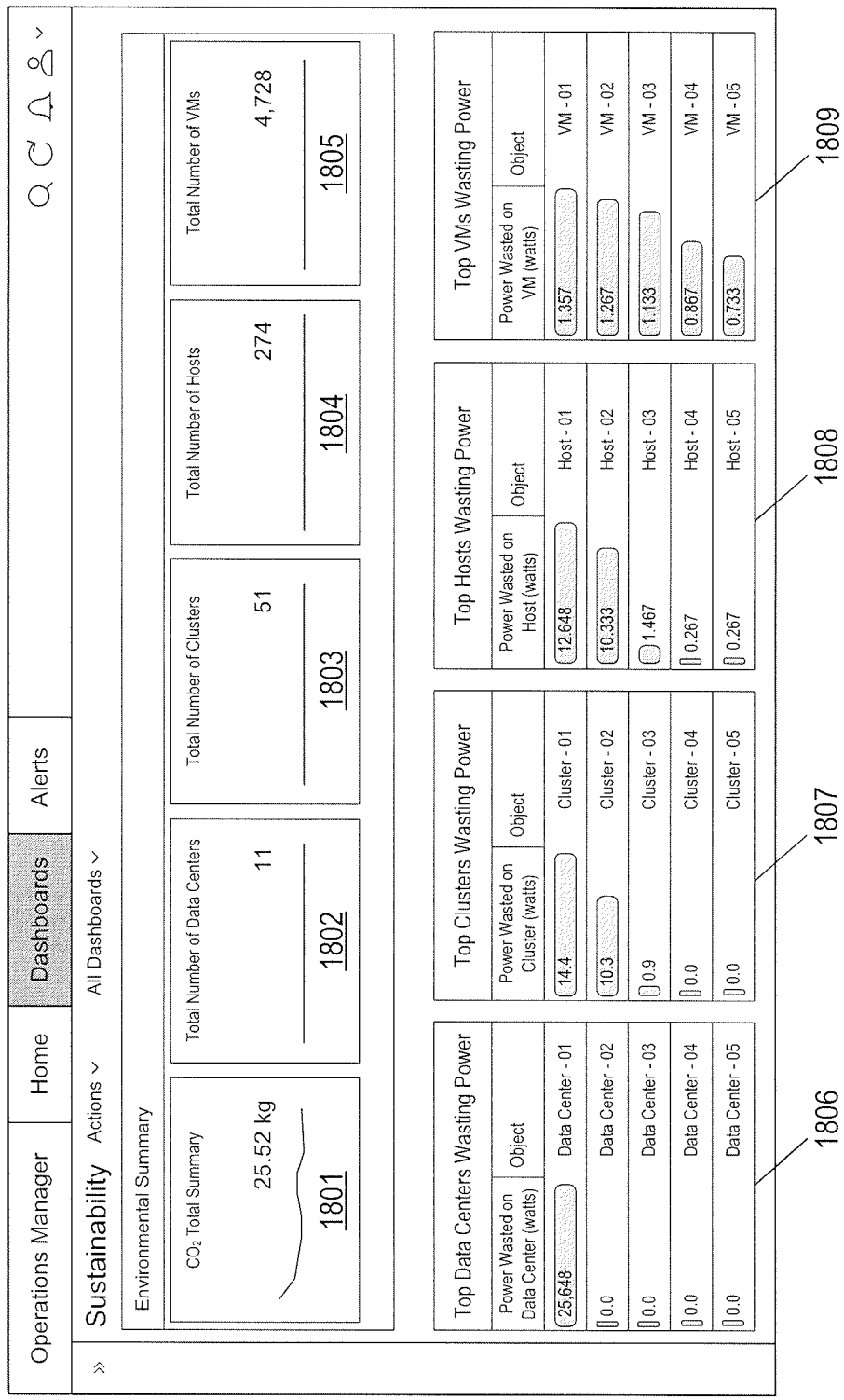

FIG. 18 shows content of an example dashboard window that displays sustainability metrics of data centers, clusters, server computers, and VMs. In FIG. 18, the dashboard window displays an environmental summary of $CO_2$ total emissions 1801, number of data centers 1802, number of clusters 1803, number of hosts 1804, and number of VMs 1805. The dashboard window also displays bar graphs of power wasted by idle virtual objects for each data center 1806, cluster 1807, server computer 1808, and VM 1809 as computed according to Equations (8)-(11). For example, data center "Data Center-01" wastes 25,648 watts of power, cluster "Cluster-01" wastes 14.4 watts, host "Host-01" wastes 12.648 watts, and VM "VM-01" wastes 1.357 watts.

Figure 19:
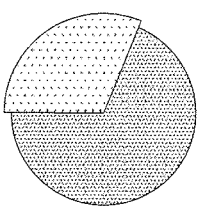

FIG. 19 shows content of an example dashboard window that displays total reclaimable metrics for server computers. The window displays a table with server computer name 1901, power usage 1902, $CO_2$ emissions 1903, reclaimable cores 1904, reclaimable memory 1905, and reclaimable disk space 1906 for each server computer. The values under power usage 1902 may be calculated using Equation (1b). The values under $CO_2$ emissions 1903 may be calculated using Equation (5). The values of the reclaimable cores, reclaimable memory, and reclaimable disk space of each server computer are computed according to Equation (15). A similar window may be used to display a table of power usage, $CO_2$ emissions, reclaimable cores, reclaimable memory, and reclaimable disk space of each cluster or data center.

Figure 20:
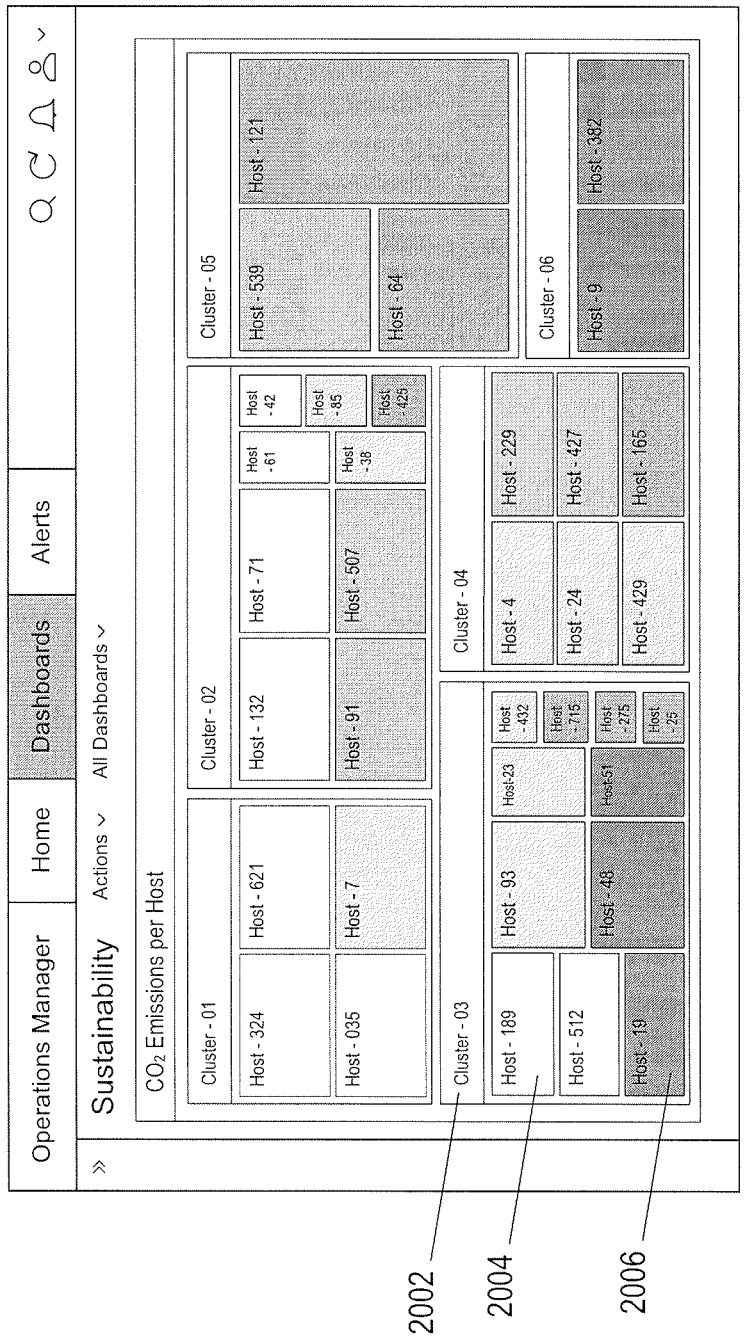

FIG. 20 shows content of an example dashboard window of $CO_2$ emissions of server computers per cluster as represented by shading. The $CO_2$ emission of each host is calculated according to Equation (5). In the example of FIG. 19, panels correspond to server computers. The emission levels of the server computers are represented by a gray scale. A server computer with a lower $CO_2$ emission than another server computer has lighter shading. For example, cluster "Cluster-03" 2002 includes server computers "Host-189" 2004 and "Host-19" 2006. Server computer "Host-19" 2006 has darker shading than server computer "Host-189" 2004, indicating that server computer "Host-19" 2006 has a larger associated $CO_2$ emission than server computer "Host-189" 2004. In another embodiment, $CO_2$ emission levels may be represented usage a color scale. For example, the color scale may range from green to red with green at one end of the color scale corresponding to low $CO_2$ emissions and red at the opposite end of the color scale corresponding to high $CO_2$ emissions. In other implementation, a window may display gray scale or color scale $CO_2$ emissions of clusters within one or more data centers calculated according to Equation (6). In another implementation, a window may display gray scale or color scale $CO_2$ emissions of data centers calculated according to Equation (7a) or Equation (7b).

Figure 21A:
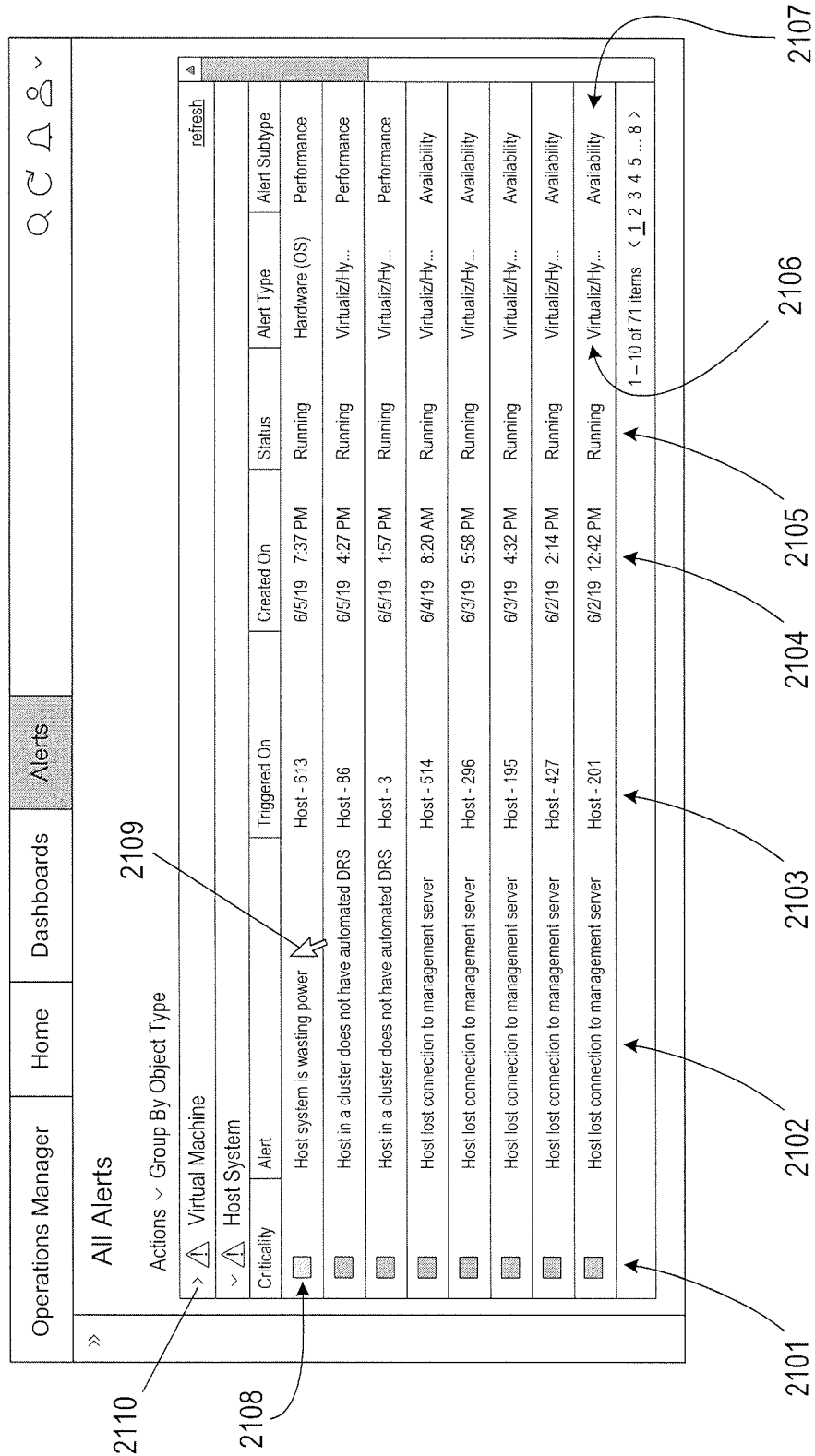
Figure 21B:
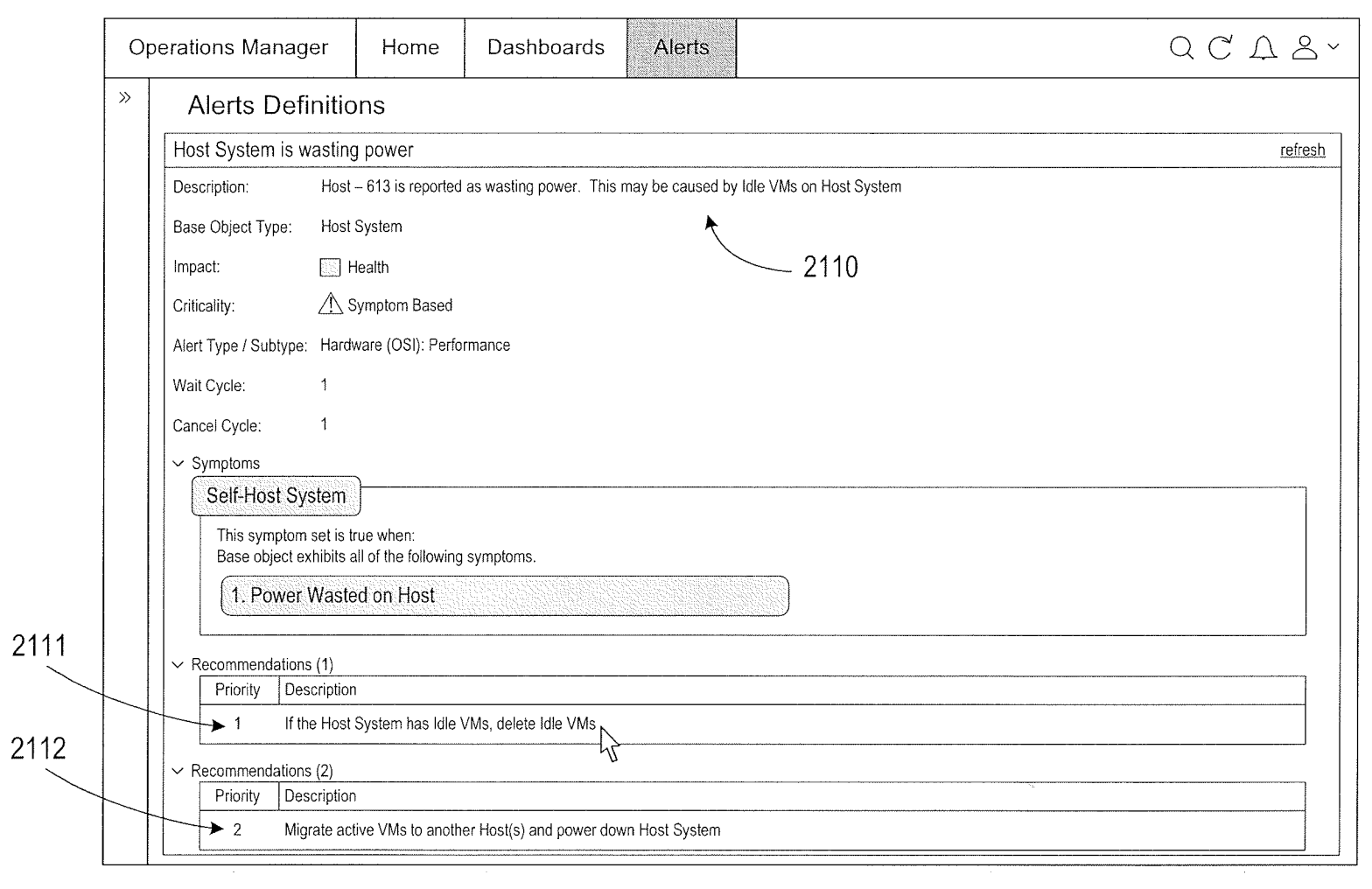

FIGS. 21A-21B show content of example alerts window and alert definitions window, respectively, in which a host is identified as wasting power. In FIG. 21A, a window displays a list of alerts corresponding to different server computers of a data center. Column 2101 provides a color coding indicating the severity of the alert. Column 2102 list the alerts for server computers. Column 2103 identifies the server computers with alerts. Columns 2104-2107 list corresponding time and date the alerts were created, status of the server computers, alert types, and alert subtypes. For example, row 2108 is an example of a "power wasting" alert generated for a server computer identified as "Host-613" created on "Jun. 5, 2019 at 7:37 pm." The server computer "Host-613" is currently running. The alert corresponds to hardware and performance. Clicking on the alert as indicated by cursor 2109 creates alert definitions window shown in FIG. 21B. The window includes a more detailed description 2110 of the alert in which server computer "Host-613" is identified as running idle virtual VMs determined according to Equation (9) and conditional Equation (12). The alert definitions window displays recommendations 2111 and 2112 for performing remedial measures to correct idle VMs. The window displays a list of alerts corresponding to power wasted for VMs of the data center. In other implementations, the window displays a list of alerts corresponding to different clusters of the data center.

FIG. 22 shows content of an example alerts window in which a threshold for power wasted on a server computer are defined by a user. The metric is Power Wasted on Host 2202, which corresponds to Equation (9). The threshold 2204 for power wasted on host is set to $Threshold_{Host}=10$. In other implementations, the window displays symptoms of power wasted by a cluster according to Equation (10) and conditional Equation (13) defined by a user. In other implementations, the window displays symptoms of power wasted by a data center according to Equation (11) and conditional Equation (14) defined by a user.

The methods described below with reference to FIGS. 23-31 are stored in one or more data-storage devices as machine-readable instructions that when executed by one or more processors of a computer system, such as the computer system shown in FIG. 1, determine sustainability of virtual infrastructure of a distributed computing system.

Figure 23:
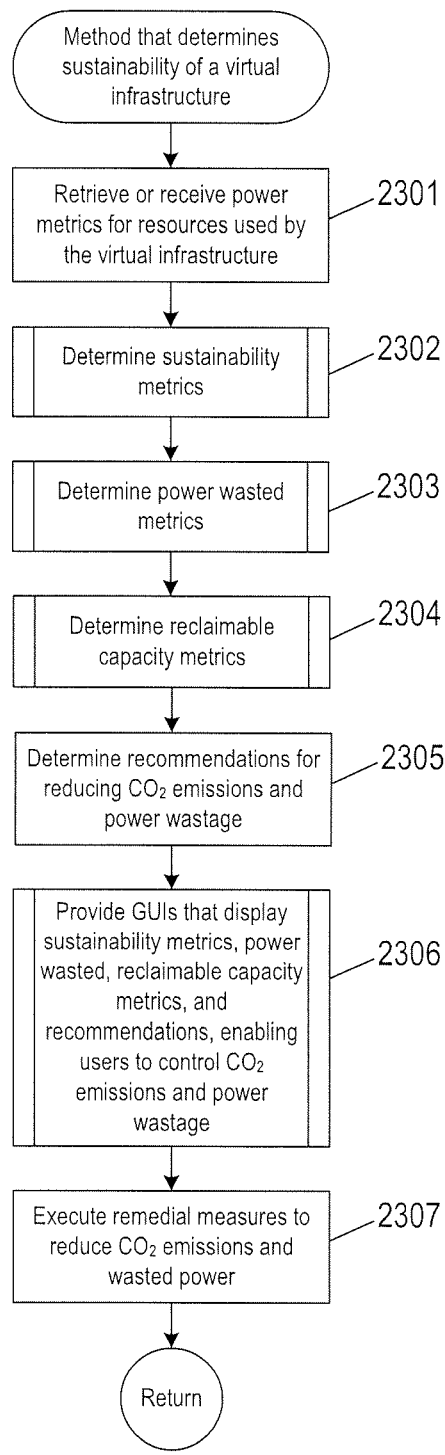
FIG. 23 is a flow diagram illustrating an example implementation a method that determines sustainability of a virtual infrastructure of a distributed computing system.

FIG. 23 is a flow diagram illustrating an example implementation a method that determines sustainability of a virtual infrastructure of a distributed computing system. In block 2301, power metrics for resources used by a virtual infrastructure of a data center are received from the resources or retrieved from a data storage device. In block 2302, a "determine sustainability metrics" procedure is performed. In block 2303, a "determine power wasted metrics" procedure is performed. In block 2304, a "determine reclaimable capacity metrics" procedure is performed. In block 2305, recommendations for remedial measures that may be automatically or manually executed to reduce $CO_2$ emissions and power wastage are determined based on the sustainability metrics, power wasted metrics, and reclaimable capacity metrics. The recommendations include consolidating virtual objects onto fewer server computers, reclaiming capacity of resources used by idle virtual objects, powering down unused server computers, or powering down server computers running idle virtual objects. The recommendations may have been determined by IT administrators. In block 2306, a "provide GUIs that display sustainability metrics, power wasted metrics, and reclaimable capacity metrics, enabling users to control $CO_2$ emissions and power wastage" procedure is performed. In block 2307, remedial measures identified in the recommendations to reduce $CO_2$ emissions and wasted power may be executed by a user or automatically executed by script programs.

Figure 24:
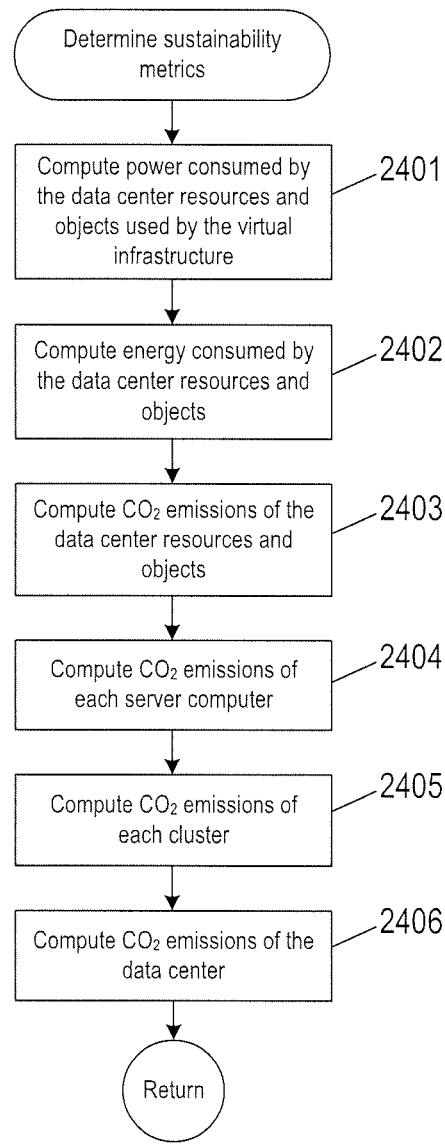
FIG. 24 is a flow diagram illustrating an example implementation of the "determine sustainability metrics" step referred to in FIG. 23.

FIG. 24 is a flow diagram illustrating an example implementation of the "determine sustainability metrics" step referred to in block 2302 of FIG. 23. In block 2401, power consumed by the data center resources and objects used by the virtual infrastructure are computed according to Equations (1a) and (1b). In block 2402, energy consumed by the data center resources and objects are computed according to Equations (2), (3a), and (3b). In block 2403, $CO_2$ emissions of the data center resources and objects are computed according to Equation (4). In block 2404, $CO_2$ emissions of each server computer of the data center are computed according to Equation (5). In block 2405, $CO_2$ emissions of each cluster of the data center are computed according to Equation (6). In block 2406, $CO_2$ emissions of the data center are computed according to Equation (7a) or (7b).

Figure 25:
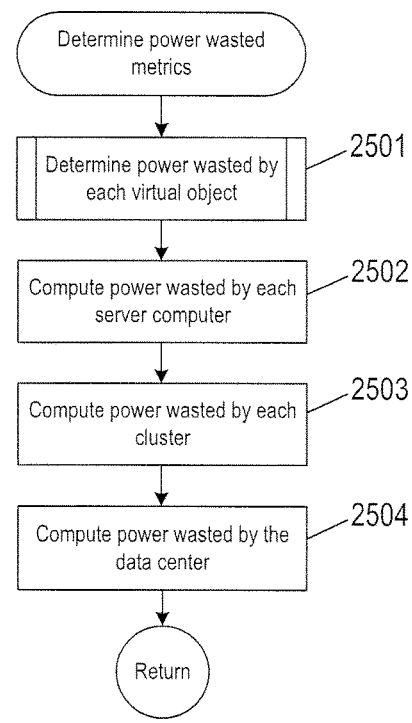
FIG. 25 is a flow diagram illustrating an example implementation of the "determine power wasted metrics" step referred to in FIG. 23.

FIG. 25 is a flow diagram illustrating an example implementation of the "determine power wasted metrics" step referred to in block 2303 of FIG. 23. In block 2501, a "determine power wasted by each virtual object" procedure is performed. In block 2502, power wasted by each server computer of the data center is calculated based on the power wasted by each virtual object according to Equation (9). In block 2503, power wasted by each cluster of the data center is calculated according to Equation (10). In block 2504, power wasted by the data center is calculated according to Equation (11).

Figure 26:
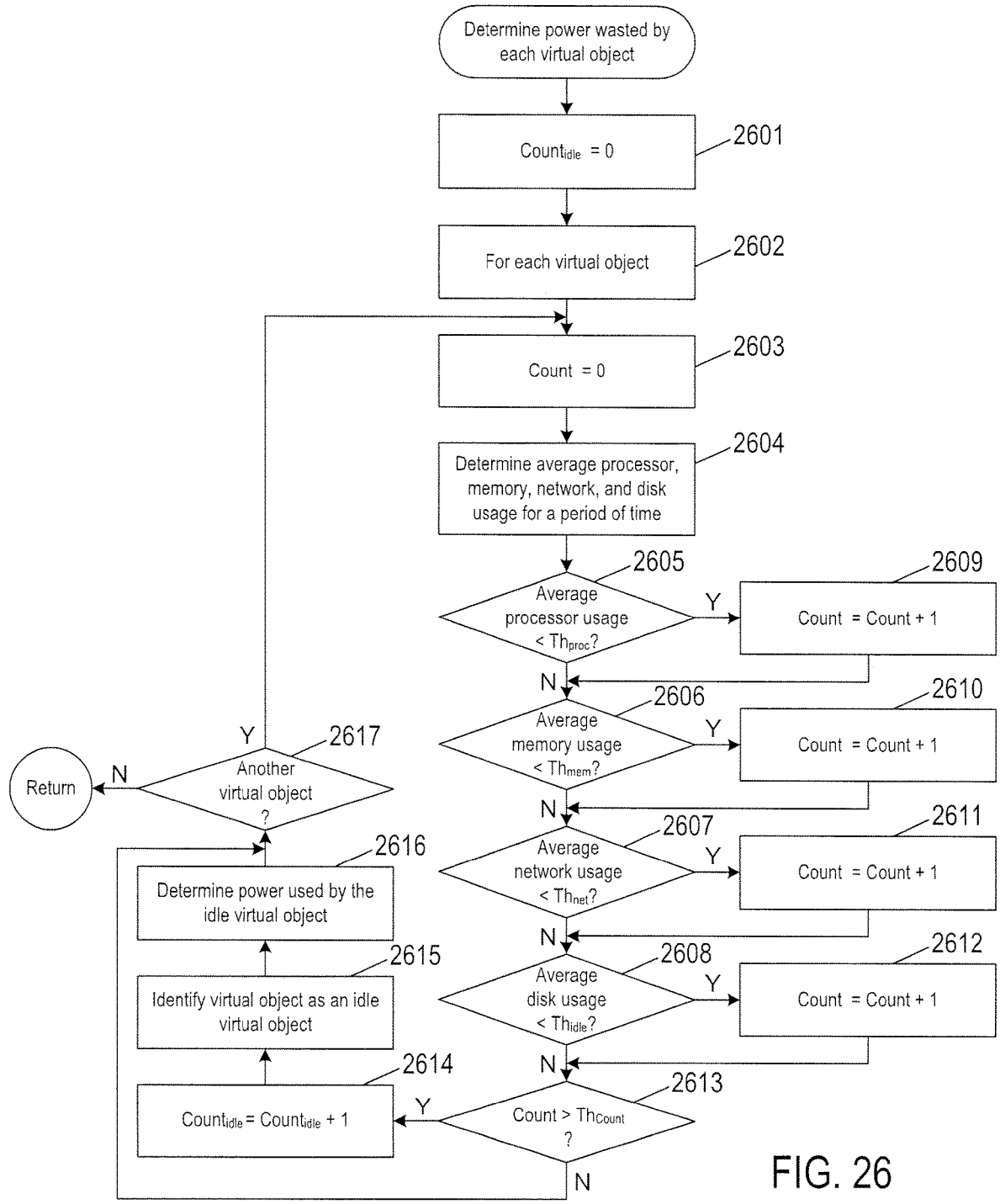
FIG. 26 is a flow diagram illustrating an example implementation of the "determine power wasted by each virtual object" step referred to in FIG. 25.

FIG. 26 is a flow diagram illustrating an example implementation of the "determine power wasted by each virtual object" step referred to in block 2501 of FIG. 25. In block 2601, a counter, denoted by $Count_{idle}$, of the number of idle virtual objects is initialized to zero. In block 2602, a loop beginning with block 2602 repeats the computation operations represented by blocks 2603-2616. In block 2603, a counter, denoted by Count, is initialized to zero. The counter Count is used to keep track of the number of resources used by a virtual object that fall below associated thresholds. In block 2604, average processor usage, average memory usage, average network usage, and average disk usage by the virtual object over a time period is determined as described above with reference to Equation (8). In decision block 2605, when average processor usage is less than processor threshold, $Th_{proc}$, control flows to block 2909. In decision block 2606, when average memory usage is less than memory threshold, $Th_{mem}$, control flows to block 2910. In decision block 2607, when average memory usage is less than memory threshold, $Th_{net}$, control flows to block 2911. In decision block 2608, when average memory usage is less than memory threshold, $Th_{disk}$, control flows to block 2912. In blocks 2609-1612, the courter, Count, is incremented. In block 2613, when the counter, Count, is less than an idle virtual object threshold, $Th_{idle}$, control flows to block 2614. Otherwise, control flows to decision block 2617. In block 2614, the counter, $Count_{idle}$, for number of idle virtual objects is incremented. In block 2615, the virtual object is identified as idle virtual object. In block 2616, power used by the idle virtual object is calculated according to Equation (1a) or Equation (1b). In decision block 2617, blocks 2603-2616 are repeated for another virtual object.

Figure 27:
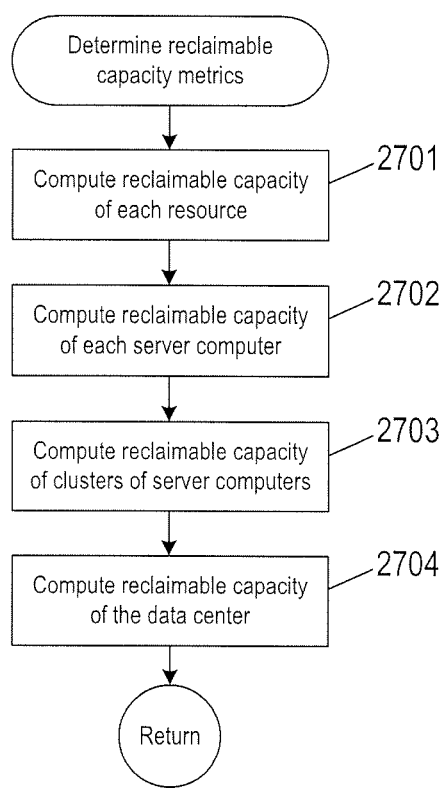
FIG. 27 is a flow diagram illustrating an example implementation of the "determine reclaimable capacity metrics" step referred to in block 2304 of FIG. 23.

FIG. 27 is a flow diagram illustrating an example implementation of the "determine reclaimable capacity metrics" step referred to in block 2304 of FIG. 23. In block 2701, reclaimable capacity of each resource is computed as described above with reference to Equation (15). In block 2702, reclaimable capacity of each server computer of the data center is computed as described above with reference to Equation (16). In block 2703, reclaimable capacity of each cluster of the data center is computed as described above with reference to Equation (17). In block 2704, reclaimable capacity of the data center is computed as described above with reference to Equation (18).

Figure 28:
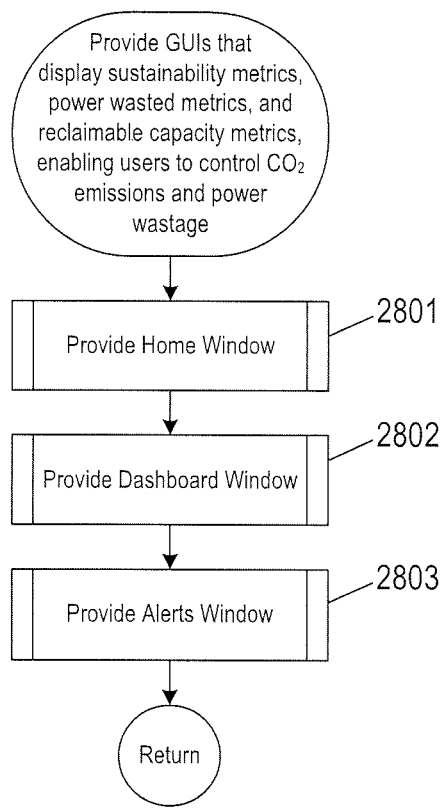
FIG. 28 is a flow diagram illustrating an example implementation of the "provide GUI that displays sustainability metrics, power wasted metrics, and reclaimable capacity metrics, enabling user to control CO2 emissions and power wastage" step referred to in FIG. 25.

FIG. 28 is a flow diagram illustrating an example implementation of the "provide GUI that displays sustainability metrics, power wasted metrics, and reclaimable capacity metrics, enabling user to control $CO_2$ emissions and power wastage" step referred to in block 2305 of FIG. 25. In block 2801, a "provide home window" procedure is performed. In block 2802, a "provide dashboard window" procedure is performed. In block 2803, a "provide alerts window" procedure is performed.

Figure 29:
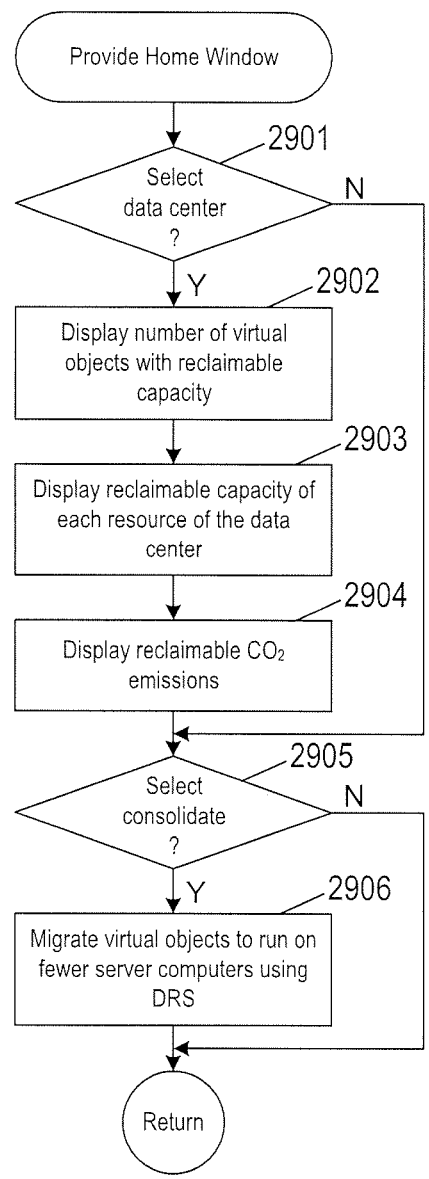
FIG. 29 is a flow diagram illustrating an example implementation of the "provide home window" step referred to in FIG. 28.

FIG. 29 is a flow diagram illustrating an example implementation of the "provide home window" step referred to in block 2801 of FIG. 28. In decision block 2901, when a user selects a data center as described above with reference to FIG. 15, control flows to block 2902. In block 2902, the number of virtual objects with reclaimable capacity is the number of idle virtual objects $Count_{idle}$ is displayed as shown in FIG. 15. In block 2903, the reclaimable capacity of resources of the data center, such as CPU, memory, and disk space, as computed in block 2701 of FIG. 27 are displayed as shown in FIG. 15. In block 2904, the reclaimable $CO_2$ emissions of the data center are displayed as shown in FIG. 15. In block 2905, when the user selects consolidate, control flows to block 2906. In block 2906, virtual objects are migrated to run on fewer server computers using DRS, as described above with reference to FIG. 17B.

Figure 30:
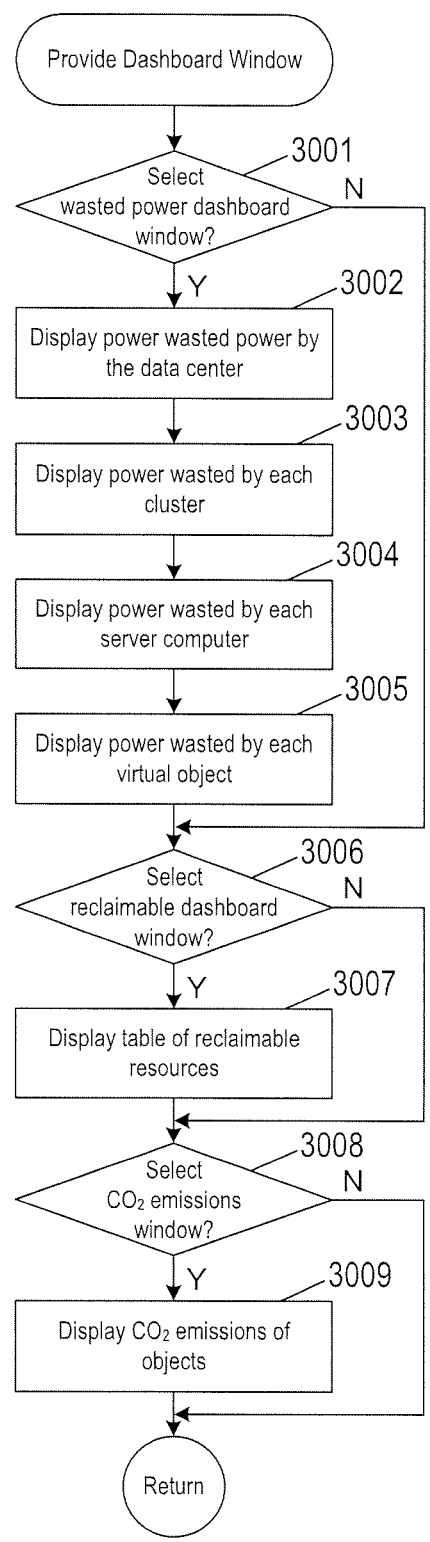
FIG. 30 is a flow diagram illustrating an example implementation of the "provide dashboard window" step referred to in FIG. 28.

FIG. 30 is a flow diagram illustrating an example implementation of the "provide dashboard window" step referred to in block 2802 of FIG. 28. In decision block 3001, when the user selects wasted power dashboard window, control flows to blocks 3002-3005. In block 3002, the power wasted by the data center computed in block 2504 is displayed as described above with reference to FIG. 18. In block 3003, the power wasted by each cluster computed in block 2503 of FIG. 25 is displayed as described above with reference to FIG. 18. In block 3004, the power wasted by each server computer computed in block 2502 is displayed as described above with reference to FIG. 18. In block 3005, the power wasted by each virtual object computed in block 2501 is displayed as described above with reference to FIG. 18. In decision block 3006, when the user selects reclaimable resources in the power dashboard window, control flows to block 3007. In block 3007, a table of reclaimable capacities of resources is displayed as described above with reference to FIG. 19. A table of reclaimable capacities of resources may be of server computers, as shown in FIG. 19, clusters of server computers, or the data center based on the reclaimable capacities computed in FIG. 27. In decision block 3008, when the user selects $CO_2$ emission window in the power dashboard window, control flows to block 3009. In block 3009, $CO_2$ emissions of each server computer may be displayed in the window as shown in FIG. 20 based on the $CO_2$ emissions computed in block 2404 of FIG. 24. The user may select $CO_2$ emissions of each cluster displayed in the window based on the $CO_2$ emissions computed in block 2405 of FIG. 24. The user may select $CO_2$ emissions of the data center displayed in the window based on the $CO_2$ emissions computed in block 2406 of FIG. 24.

Figure 31:
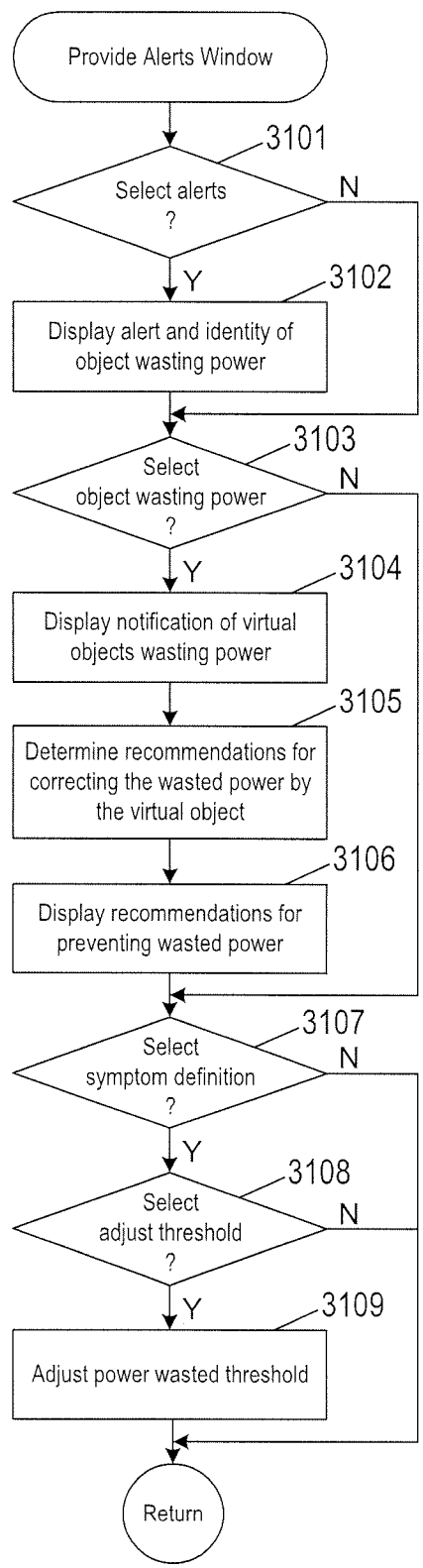
FIG. 31 is a flow diagram illustrating an example implementation of the "provide alerts window" step referred to in FIG. 28.

FIG. 31 is a flow diagram illustrating an example implementation of the "provide alerts window" step referred to in block 2803 of FIG. 28. In decision block 3101, when the user selects alerts of the alerts window, control flows to block 3102. In block 3102, an alert and identity of the object wasting power is displayed in a window, as described above with reference to FIG. 21A. In block 3103, when the user selects the object wasting power, control flows to block 3104. In block 3104, a notification of the virtual object wasting power is displayed in a window as described above with reference FIG. 21B. In block 3105, recommendations for correcting the virtual object wasting power are determined. In block 3106, the recommendations for correcting the virtual object wasting power are displayed in the windows as described above with reference to FIG. 21B. In decision block 3107, when the user selects system definitions, control flows to block 3108. In decision block 3108, when the user selects adjust threshold, control flows to block 3109. In block 3109, the power wasted threshold of the virtual object may be adjusted by the user.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In an automated computer-implemented process executed by a monitoring server for maintaining sustainability of a virtual infrastructure of a distributed computing system, the improvement comprising: determining sustainability metrics that represent amounts of $CO_2$ emissions created by the distributed computing system based on power metrics sent by metrics sources to the monitoring server, the power metrics representing power usage by resources of the virtual infrastructure;
  identifying idle virtual objects of the virtual infrastructure based on the power metrics;
  determining power wasted metrics for the idle virtual objects of the virtual infrastructure based on the power metrics;
  determining reclaimable capacities of each of the resources of the distributed computing system that are used by the idle virtual objects;
  determining one or more recommendations for reducing $CO_2$ emissions and power wasted by the idle virtual objects based on the sustainability metrics, the power wasted metrics, and the reclaimable capacities;
  displaying in a graphical user interface ("GUI") of a display the sustainability metrics, power wasted metrics, reclaimable capacities of resources, alerts identifying the idle virtual objects wasting power, and the one or more recommendations for reducing $CO_2$ emissions and reclaiming wasted resources used by the idle virtual objects;
  and automatically executing one or more remedial measures that reduce CO2 emissions and reclaim the wasted resources in response to a user selecting one or more recommendations displayed in the GUI, thereby reducing CO2 emissions and power wasted by the idle virtual objects;
  and automatically, based on the one or more recommendations for reducing CO2 emissions and reclaiming wasted resources used by the idle virtual objects, performing one or more of consolidating virtual objects onto fewer server computers, reclaiming capacity of resources used by idle virtual objects of the virtual infrastructure, powering down unused server computers, and powering down server computers running only idle virtual objects.

2. The process of claim 1, wherein determining the sustainability metrics comprises:
  computing $CO_2$ emissions of the resources used by virtual infrastructure based on the power usage of the resources;
  computing $CO_2$ emissions of each host of the data center based on the $CO_2$ emissions of the resources;
  computing $CO_2$ emissions of each cluster of the data center based on the $CO_2$ emissions of each host; and
  computing $CO_2$ emissions of the data center based on $CO_2$ emissions of the clusters of hosts.

3. The process of claim 1, wherein determining the power wasted metrics comprises:
  determining the idle virtual objects of the virtual infrastructure based one or more processor usage, memory usage, network usage, and data storage usage by each virtual object of the virtual infrastructure;
  determining power wasted by each of the idle virtual object;
  for each host, determining power wasted by the host based on the power wasted by the idle virtual object running on the host;
  for each cluster, determining power wasted by the cluster based on the power wasted by each host; and
  determining power wasted by the distributed computing system based on power wasted by the clusters of hosts.

4. The process of claim 1, wherein determining reclaimable capacity of the resources comprises:
  determining reclaimable capacity of each resource used by the virtual infrastructure;
  determining reclaimable capacity of each host used by the virtual infrastructure based on the reclaimable capacity of each resource;
  determining reclaimable capacity of each cluster used by the virtual infrastructure based on the reclaimable capacity of each host; and
  determining reclaimable capacity of the data center based on the reclaimable capacity of each cluster.

5. A computer system that maintains sustainability of a virtual infrastructure of a distributed computing system, the computer system comprising: one or more processors; one or more data-storage devices;
  and machine-readable instructions stored in the one or more data-storage devices that when executed using the one or more processors controls the system to preform operations comprising: determining sustainability metrics that represent amounts of $CO_2$ emissions created by the distributed computing system based on power metrics sent by metrics sources to the computer system, the power metrics representing power usage by resources of the virtual infrastructure: identifying idle virtual objects of the virtual infrastructure based on the power metrics;
  determining power wasted metrics for the idle virtual objects of the virtual infrastructure based on the power metrics;
  determining reclaimable capacities of each of the resources of the distributed computing system that are used by the idle virtual objects;
  determining one or more recommendations for reducing $CO_2$ emissions and power wasted by the idle virtual objects based on the sustainability metrics, the power wasted metrics, and the reclaimable capacities;

displaying in a graphical user interface ("GUI") a display alerts identifying the idle virtual objects wasting power, the one or more recommendations for reducing $CO_2$ emissions and reclaiming wasted resources used by the idle virtual objects, the power wasted metrics, and the reclaimable capacities;

and automatically executing one or more remedial measures to that reduce the $CO_2$ emissions and the power wasted by the idle virtual objects in response to a user selecting one or more of the recommendations displayed in the GUI;

and automatically, based on the one or more recommendations for reducing CO2 emissions and reclaiming wasted resources used by the idle virtual objects, performing one or more of consolidating virtual objects onto fewer server computers, reclaiming capacity of resources used by idle virtual objects of the virtual infrastructure, powering down unused server computers, and powering down server computers running only idle virtual objects.

6. The computer system of claim 5, wherein determining the sustainability metrics comprises:
computing $CO_2$ emissions of the resources used by virtual infrastructure based on the power usage of the resources;
computing CO2 emissions of each host of the data center based on the $CO_2$ emissions of the resources;
computing $CO_2$ emissions of each cluster of the data center based on the $CO_2$ emissions of each host; and
computing $CO_2$ emissions of the data center based on $CO_2$ emissions of the clusters of hosts.

7. The computer system of claim 5, wherein determining the power wasted metrics of the virtual infrastructure comprises:
determining the idle virtual objects of the virtual infrastructure that are idle based one or more processor usage, memory usage, network usage, and data storage usage by for each virtual object of the virtual infrastructure;
determining power wasted by each of the idle virtual objects;
for each host, determining power wasted by the host based on the power wasted by the idle virtual object running on the host;
for each cluster, determining power wasted by the cluster based on the power wasted by each host; and
determining power wasted by the distributed computing system based on power wasted by the clusters of hosts.

8. The computer system of claim 5, wherein determining reclaimable capacity of the resources comprises:
determining reclaimable capacity of each resource used by the virtual infrastructure;
determining reclaimable capacity of each host used by the virtual infrastructure based on the reclaimable capacity of each resource;
determining reclaimable capacity of each cluster used by the virtual infrastructure based on the reclaimable capacity of each host; and
determining reclaimable capacity of the data center based on the reclaimable capacity of each cluster.

9. A non-transitory computer-readable medium encoded with machine-readable instructions that when executed using one or more processors of a computer system control the one or more processors to execute operations comprising: determining sustainability metrics that represent amounts of $CO_2$ emissions created by a distributed computing system based on power metrics sent by metrics sources to the one or more processors, the power metrics representing power usage by resources of a virtual infrastructure;
identifying idle virtual objects of the virtual infrastructure based on the power metrics sent;
determining power wasted metrics for the idle virtual objects of the virtual infrastructure based on the power metrics;
determining reclaimable capacity of each of the resources of the distributed computing system that are used by the idle virtual objects;
determining one or more recommendations for reducing $CO_2$ emissions and power wastage by the virtual infrastructure based on one or more of the sustainability metrics, the power wasted metrics, and the reclaimable capacity of the objects displaying in a graphical user interface ("GUI") of a display the one or more recommendations for reducing $CO_2$ emissions and reclaiming wasted resources used by the idle virtual objects, an alert identifying the idle virtual objects wasting power, the power wasted metrics, and the reclaimable capacities;
and automatically executing one or more remedial measures to that reduce the $CO_2$ emissions and the power wasted by the idle virtual machines in response to the user selecting one or more of the recommendations displayed in the GUI;
and automatically, based on the one or more recommendations for reducing CO2 emissions and reclaiming wasted resources used by the idle virtual objects, performing one or more of consolidating virtual objects onto fewer server computers, reclaiming capacity of resources used by idle virtual objects of the virtual infrastructure, powering down unused server computers, and powering down server computers running only idle virtual objects.

10. The medium of claim 9, wherein determining the sustainability metrics comprises:
computing $CO_2$ emissions of the resources used by virtual infrastructure based on the power usage of the resources;
computing CO2 emissions of each host of the data center based on the $CO_2$ emissions of the resources;
computing CO2 emissions of each cluster of the data center based on the $CO_2$ emissions of each host; and
computing CO2 emissions of the data center based on $CO_2$ emissions of the clusters of hosts.

11. The medium of claim 9, wherein determining the power wasted metrics of the virtual infrastructure comprises:
determining the idle virtual objects of the virtual infrastructure that are idle based one or more processor usage, memory usage, network usage, and data storage usage by for each virtual object of the virtual infrastructure;
determining power wasted by each of the idle virtual objects;
for each host, determining power wasted by the host based on the power wasted by the idle virtual object running on the host;
for each cluster, determining power wasted by the cluster based on the power wasted by each host; and
determining power wasted by the distributed computing system based on power wasted by the clusters of hosts.

12. The medium of claim 9, wherein determining reclaimable capacity of the resources comprises:
determining reclaimable capacity of each resource used by the virtual infrastructure;

determining reclaimable capacity of each host used by the virtual infrastructure based on the reclaimable capacity of each resource;

determining reclaimable capacity of each cluster used by the virtual infrastructure based on the reclaimable capacity of each host; and determining reclaimable capacity of the data center based on the reclaimable capacity of each cluster.

* * * * *